US009779757B1

(12) United States Patent
Blanksteen et al.

(10) Patent No.: US 9,779,757 B1
(45) Date of Patent: Oct. 3, 2017

(54) VISUAL INDICATION OF AN OPERATIONAL STATE

(75) Inventors: Scott I. Blanksteen, Issaquah, WA (US); Gregory M. Hart, Mercer Island, WA (US); Charles S. Rogers, III, Seattle, WA (US); Heinz-Dominik Langhammer, San Francisco, CA (US); Ronald Edward Webber, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 793 days.

(21) Appl. No.: 13/561,840

(22) Filed: Jul. 30, 2012

(51) Int. Cl.
*G10L 21/00* (2013.01)
*G10L 21/10* (2013.01)

(52) U.S. Cl.
CPC .................................. *G10L 21/10* (2013.01)

(58) Field of Classification Search
CPC ......... G10L 15/22; G10L 15/00; G10L 15/24; G10L 15/265; G10L 17/26; G10L 2015/223; G10L 21/10; G01C 21/3608; G06Q 30/0261; G06F 17/30026; G06F 17/30755; G06F 3/162; G06F 3/165; G06F 3/167; G06F 2203/0381
See application file for complete search history.

(56) References Cited

U.S. PATENT DOCUMENTS

| 4,689,554 | A | * | 8/1987 | Schnaibel | G07C 5/0808 |
| | | | | | 324/73.1 |
| 5,983,186 | A | * | 11/1999 | Miyazawa et al. | 704/275 |
| 6,324,514 | B2 | * | 11/2001 | Matulich et al. | 704/275 |
| 6,587,043 | B1 | * | 7/2003 | Kramer | B60Q 9/008 |
| | | | | | 340/425.5 |
| 7,418,392 | B1 | | 8/2008 | Mozer et al. | |
| 7,720,683 | B1 | | 5/2010 | Vermeulen et al. | |
| 7,774,204 | B2 | | 8/2010 | Mozer et al. | |
| 8,461,443 | B2 | | 6/2013 | McKinney et al. | |
| 8,814,673 | B1 | * | 8/2014 | Brunell | G07F 17/3211 |
| | | | | | 362/458 |

(Continued)

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

(Continued)

*Primary Examiner* — Abdelali Serrou
(74) *Attorney, Agent, or Firm* — Lee & Hayes, PLLC

(57) ABSTRACT

Architectures and techniques to visually indicate an operational state of an electronic device. In some instances, the electronic device comprises a voice-controlled device configured to interact with a user through voice input and visual output. The voice-controlled device may be positioned in a home environment, such as on a table in a room of the environment. The user may interact with the voice-controlled device through speech and the voice-controlled device may perform operations requested by the speech. As the voice-controlled device enters different operational states while interacting with the user, one or more lights of the voice-controlled device may be illuminated to indicate the different operational states.

40 Claims, 17 Drawing Sheets

(56) References Cited

U.S. PATENT DOCUMENTS

| | | | |
|---|---|---|---|
| 9,011,247 B2* | 4/2015 | Gronkowski | G07F 17/3211 463/30 |
| 9,141,150 B1 | 9/2015 | Trundle et al. | |
| 2001/0015718 A1* | 8/2001 | Hinckley et al. | 345/156 |
| 2003/0028382 A1* | 2/2003 | Chambers et al. | 704/275 |
| 2003/0076843 A1* | 4/2003 | Holbrook | H04L 12/5895 370/401 |
| 2003/0118200 A1 | 6/2003 | Beaucoup et al. | |
| 2003/0149803 A1 | 8/2003 | Wilson | |
| 2004/0170086 A1* | 9/2004 | Mayer | H04R 1/083 367/178 |
| 2004/0212323 A1 | 10/2004 | Gutta et al. | |
| 2005/0141696 A1 | 6/2005 | Kato et al. | |
| 2005/0192727 A1* | 9/2005 | Shostak | G07C 5/008 701/37 |
| 2005/0200598 A1 | 9/2005 | Hayes et al. | |
| 2005/0273218 A1* | 12/2005 | Breed | B60C 11/24 701/2 |
| 2006/0025897 A1* | 2/2006 | Shostak | B60C 23/005 701/1 |
| 2006/0076908 A1 | 4/2006 | Morgan et al. | |
| 2006/0123150 A1 | 6/2006 | Iwai et al. | |
| 2006/0256938 A1 | 11/2006 | Ruckart | |
| 2006/0262221 A1 | 11/2006 | Yuasa et al. | |
| 2007/0057781 A1* | 3/2007 | Breed | B60K 35/00 340/457.1 |
| 2007/0097204 A1 | 5/2007 | Gasper et al. | |
| 2007/0189026 A1 | 8/2007 | Chemel et al. | |
| 2007/0260886 A1 | 11/2007 | Dufour | |
| 2007/0291483 A1 | 12/2007 | Lys | |
| 2008/0137893 A1* | 6/2008 | Ross | G01C 9/04 381/332 |
| 2008/0265797 A1 | 10/2008 | Van Doorn | |
| 2009/0004973 A1 | 1/2009 | Andrews et al. | |
| 2009/0043580 A1* | 2/2009 | Mozer et al. | 704/251 |
| 2009/0052684 A1* | 2/2009 | Ishibashi | H04R 3/005 381/66 |
| 2009/0108067 A1* | 4/2009 | Roquemore | G06K 7/10851 235/462.15 |
| 2009/0146583 A1 | 6/2009 | Bhadri et al. | |
| 2009/0196016 A1* | 8/2009 | Massara et al. | 362/86 |
| 2010/0071535 A1 | 3/2010 | McKinney et al. | |
| 2010/0109536 A1* | 5/2010 | Jung et al. | 315/158 |
| 2010/0213876 A1* | 8/2010 | Adamson | H05B 37/0272 315/312 |
| 2011/0051907 A1* | 3/2011 | Jaiswal et al. | 379/88.02 |
| 2011/0197070 A1* | 8/2011 | Mizrah | 713/176 |
| 2012/0009995 A1* | 1/2012 | Osgood | G07F 17/32 463/35 |
| 2012/0169777 A1* | 7/2012 | Budni et al. | 345/690 |
| 2012/0223885 A1 | 9/2012 | Perez | |
| 2012/0289291 A1 | 11/2012 | Moran et al. | |
| 2013/0005458 A1* | 1/2013 | Kosta | G07F 17/3206 463/31 |
| 2013/0184078 A1* | 7/2013 | Brunell | G07F 17/3202 463/40 |
| 2013/0208103 A1 | 8/2013 | Sands et al. | |

OTHER PUBLICATIONS

Office Action for U.S. Appl. No. 13/830,257, mailed on Feb. 24, 2015, Daniel Christopher Bay, "Voice Controlled Assistant with Light Indicator", 8 pages.

Office action for U.S. Appl. No. 13/743,282, mailed on Aug. 12, 2015, Bezos et al., "Visual Indication of an Operational State", 13 pages.

Office action for U.S. Appl. No. 13/830,257 mailed on Sep. 8, 2015, Bay et al., "Voice Controlled Assistant with Light Indicator", 8 pages.

Office action for U.S. Appl. No. 13/830,257, mailed on Mar. 29, 2016, Bay et al., "Voice Controlled Assistant with Light Indicator", 11 pages.

Office action for U.S. Appl. No. 13/743,282, mailed on Apr. 4, 2016, Bezos et al., "Visual Indication of an Operational State", 17 pages.

Office action for U.S. Appl. No. 13/743,282, mailed on Aug. 10, 2016, Bezos et al., "Visual Indication of an Operational State", 17 pages.

Office action for U.S. Appl. No. 13/743,282, mailed on Jan. 20, 2017, Bezos et al., "Visual Indication of an Operational State", 19 pages.

Office action for U.S. Appl. No. 13/830,257, mailed on Dec. 15, 2016, Bay et al., "Voice Controlled Assistant with Light Indicator", 6 pages.

Office action for U.S. Appl. No. 13/830,257, mailed on Sep. 21, 2016, Bay et al., "Voice Controlled Assistant with Light Indicator", 7 pages.

* cited by examiner a user 104. The architecture 100 includes an electronic
VISUAL INDICATION OF AN OPERATIONAL STATE

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
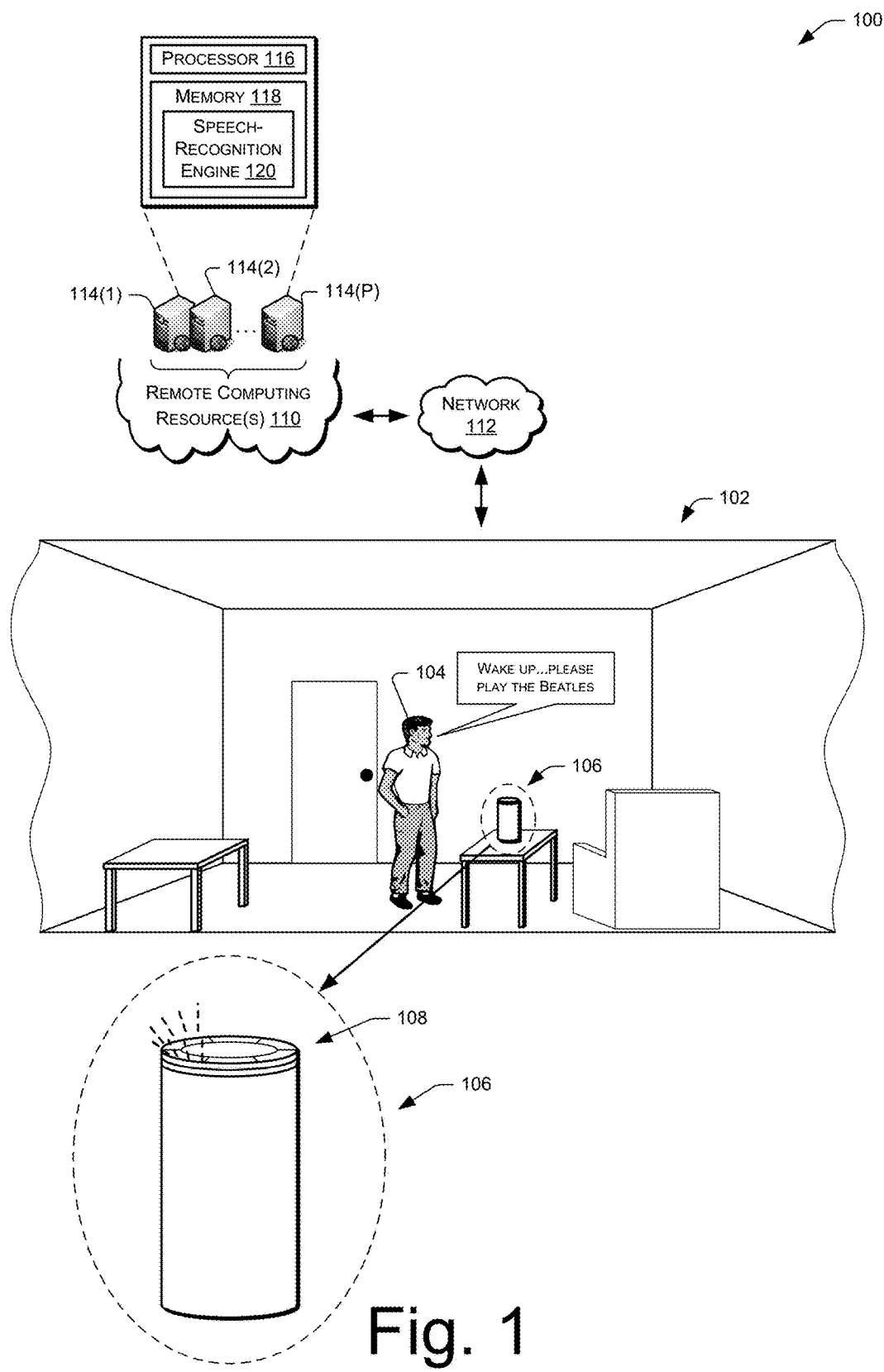
FIG. 1 shows an illustrative voice interaction computing architecture set in a home environment.

This disclosure describes architectures and techniques to visually indicate an operational state of an electronic device. In some instances, the electronic device comprises a voice-controlled device configured to interact with a user through voice input and visual output. The voice-controlled device may be positioned in a home environment, such as on a table in a room of the environment, or in any other type of environment. The voice-controlled device may include one or more microphones such that the user may interact with the voice-controlled device through speech captured by the microphone(s). In response to capturing the speech, the voice-controlled device may perform operations requested by the speech. As the voice-controlled device enters different operational states while interacting with the user, one or more lights of the voice-controlled device may be illuminated to indicate the different operational states.

As described above, a microphone of the voice-controlled device may detect a sound that includes speech of a user and generate an audio signal from the sound. In response to detecting the sound and/or generating the audio signal, the device may enter an operational state. For instance, the device may initially enter a state in which the device has detected sound and has transitioned from an inactive state to an active state. Upon entering the operational state, such as the active state, lights of the device may be illuminated in a particular manner to indicate the operational state of the device to the user. For example, the lights may be illuminated in a particular sequence, pattern, color, and/or for a particular period of time. In some instances, the lights are arranged along a perimeter of a top portion of the device.

After, while or prior to indicating the operational state, the device may begin processing the audio signal to decode the utterance in the audio signal. The operational state of the device may then change to a state of processing and the lights may be illuminated in a different manner to indicate the changed operational state. Upon decoding the utterance, the device may perform an operation requested by the utterance and enter an operational state associated with performing the operation. As the device enters this operational state, the lights may again be illuminated in a different manner to indicate this operational state. If, for example, the user requests that the voice-controlled device launch a particular application, the device may illuminate the lights in a manner that is custom to the application, thus providing feedback to the user that the device is running the application. If, on the other hand, the device is unable to decode the utterance (e.g., determine a requested operation), the lights may be illuminated to indicate that the device is unable to decode the utterance.

By illuminating one or more lights of a device in a particular sequence, pattern, color, and/or for a particular period of time that is associated with the operational state, the user may receive a visual indication of the current status of the device.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Environment

FIG. 1 shows an illustrative voice interaction computing architecture 100 set in a home environment 102 that includes a user 104. The architecture 100 includes an electronic voice-controlled device 106 with which the user 104 may interact. In the illustrated implementation, the voice-controlled device 106 is positioned on a table within a room the home environment 102. In other implementations, it may be placed in any number of locations (e.g., on the ceiling, wall, in a lamp, beneath a table, etc.). Further, more than one device 106 may be positioned in a single room, or one device may be used to accommodate user interactions from more than one room.

Generally, the voice-controlled device 106 has at least one microphone and at least one speaker to facilitate audio interactions with the user 104 and/or other users. In some instances, the voice-controlled device 106 is implemented without a haptic input component (e.g., keyboard, keypad, touch screen, joystick, control buttons, etc.) or a display other than mono- or multi-colored lights. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible or visual output. One example implementation of the voice-controlled device 106 is provided below in more detail with reference to FIG. 2.

The voice-controlled device 106 may also include one or more lights 108 (referred to herein as "the lights 108") to indicate an operational state of the voice-controlled device 106. For instance, as the microphone of the voice-controlled device 106 detects sound from the environment 102, such as sounds uttered from the user 104, and/or generates an audio signal from the sound, the lights 102 may be illuminated in a particular manner to indicate that a sound is detected and to indicate an operational state of the device 106. The voice-controlled device 106 may then perform speech recognition on the audio signal and illuminate the lights 108 a different manner. In response to recognizing the speech from the user 104, the voice-controlled device 106 may perform an action and illuminate the lights 108 in yet another manner to indicate to the user 104 that the action is being performed.

In some instances, the voice-controlled device 106 may include a speech-recognition engine for recognizing speech and causing performance of an action in response. Details of the speech recognition engine will be discussed in further detail below in reference to FIG. 2.

In some instances the voice-controlled device 106 may operate in conjunction with or may otherwise utilize computing resources 110 that are remote from the environment 102. For instance, the voice-controlled device 106 may couple to the remote computing resources 110 over a network 112. As illustrated, the remote computing resources 110 may be implemented as one or more servers 114(1), 114(2), . . . , 114(P) and may, in some instances form a portion of a network-accessible computing platform implemented as a computing infrastructure of processors, storage, software, data access, and so forth that is maintained and accessible via a network such as the Internet. The remote computing resources 110 do not require end-user knowledge of the physical location and configuration of the system that delivers the services. Common expressions associated for these remote computing devices 110 include "on-demand computing", "software as a service (SaaS)", "platform computing", "network-accessible platform", "cloud services", "data centers", and so forth.

The servers 114(1)-(P) include a processor 116 and memory 118, which may store or otherwise have access to a speech-recognition engine 120 for recognizing speech and, potentially, causing performance of an action in response. The voice-controlled device 106 may utilize the speech-recognition engine 120 in addition to, or instead of, a speech-recognition engine of the voice-controlled device 106. For instance, when the voice-controlled device 106 is able to connect to the remote computing resources 110 via the network 112, the voice-controlled device 106 may upload an audio signal to the remote computing resources 110 for processing. In some implementations, the remote computing resources 110 have a computational capacity that far exceeds the computational capacity of the voice-controlled device 106. Therefore, the voice-controlled device 106 may utilize the speech-recognition engine 120 for performing relatively complex analysis on an audio signal generated from sounds in the environment 102.

In some implementations, the voice-controlled device 106 may receive vocal input from the user 104 and may perform speech recognition locally at the speech recognition engine of the voice-controlled device 106 and/or remotely at the resources 110. In either instance, the vocal input may be interpreted to form an operational request or command. The requests may be for essentially type of operation, such as database inquires, requesting and consuming entertainment (e.g., gaming, finding and playing music, movies or other content, etc.), personal management (e.g., calendaring, note taking, etc.), online shopping, financial transactions, and so forth.

The voice-controlled device 106 may communicatively couple to the network 112 via wired technologies (e.g., wires, USB, fiber optic cable, etc.), wireless technologies (e.g., RF, cellular, satellite, Bluetooth, etc.), or other connection technologies. The network 112 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Example Voice-Controlled Device

Figure 2:
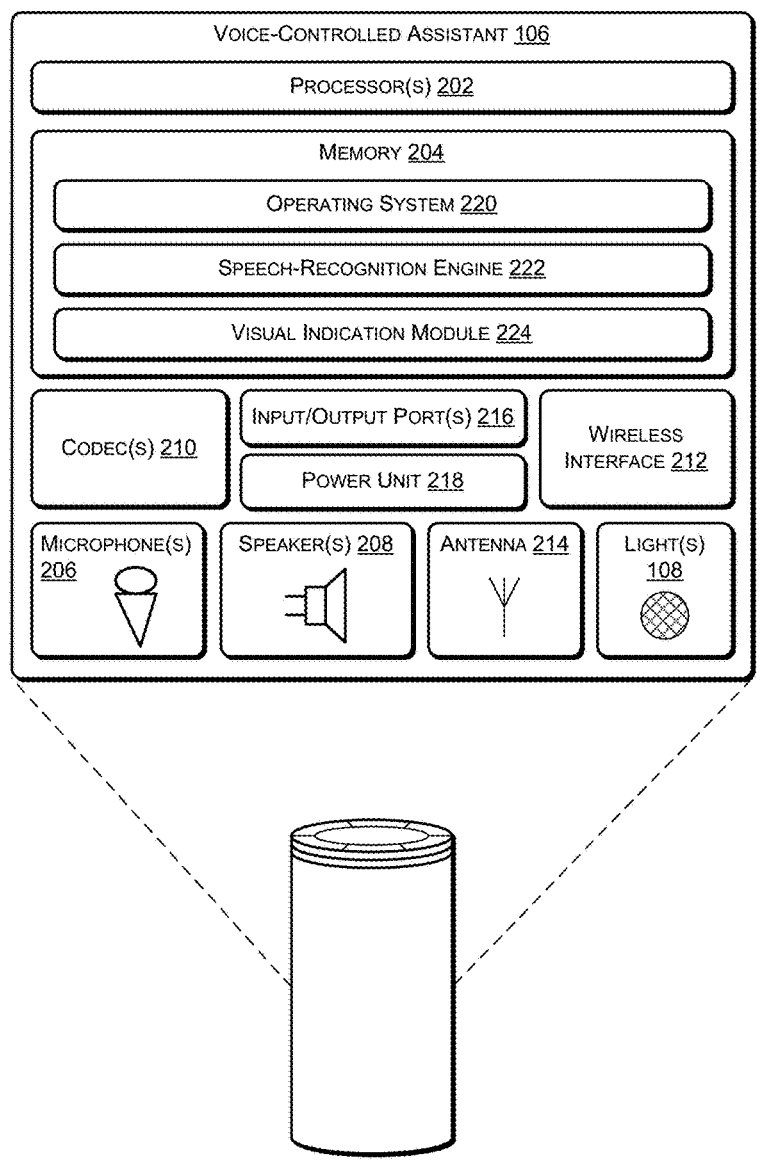
FIG. 2 shows functional components of a voice-controlled device of FIG. 1 in more detail.

FIG. 2 shows functional components of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a touch screen to facilitate visual presentation and user touch input. Instead, the device 106 may be implemented with the ability to receive and output audio, a network interface (wireless or wire-based), power, and limited processing/memory capabilities.

In some instances, the voice-controlled device 106 may include a substantially cylindrically shaped housing to house various components of the voice-controlled device 106. However, in other instances the housing of the voice-controlled device 106 is shaped to form a different shape, such as a cube, cone, pyramid, and so on. Further, the cross-sectional shape of the device 106 may be circular, elliptical, or polygonal, with the perimeter including one or more lights as described in further detail below.

In the illustrated implementation, the voice-controlled device 106 includes one or more processors 202 (referred to herein as "the processor 202") and memory 204. The memory 204 may include computer-readable storage media ("CRSM"), which may be any available physical media accessible by the processor 202 to execute instructions stored on the memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 202.

The voice-controlled device 106 includes one or more microphones 206 to detect and/or receive a sound, such as user's speech, and generate an audio signal from the received sound. The voice-controlled device 106 may also include one or more speakers 208 to output audio sounds. One or more codecs 210 may be coupled to the microphone 206 and speaker 208 to encode and/or decode the audio signals. The codec 210 may convert audio signal between analog and digital formats. A user may interact with the device 106 by speaking to it, and the microphone 206 receives the user speech and generates an audio signal. The codec 210 encodes the audio signal and transfers that encoded audio signal to other components of the device 106 or to another device (e.g., a remote device in a cloud computing environment, a device located in the environment 102, etc.). The device 106 can communicate back to the user by emitting audible statements through the speaker 208. In this manner, the user interacts with the voice-controlled device 106 simply through speech, without use of a keyboard or display common to other types of devices.

In the illustrated example, the voice-controlled device 106 includes a wireless interface 212 coupled to an antenna 214 to facilitate a wireless connection to a network. The wireless interface 212 may implement one or more of various wireless technologies, such as wifi, Bluetooth, RF, and so on.

One or more input/output ports 216 (e.g., USB port) may further be provided as part of the device 106 to, for example, facilitate a wired connection to a network, or a plug-in network device that communicates with other wireless networks. In addition to the one or more input/output ports 216, or as an alternative thereto, other forms of wired connections may be employed, such as a broadband connection. A power unit 218 is further provided to distribute power to the various components on the device 106.

As discussed above, the voice-controlled device 106 also includes the lights 108. The lights 108 may include any number of lights (e.g., 4, 6, 12, etc.) and may be arranged along a perimeter of a top portion of a housing of the voice-controlled device 106. In one example, the lights 108 comprise a single integrated light that may be illuminated in its entirety or in one or more segments, while in other examples the lights 108 form multiple discrete lights. In some instances, the lights 108 are arranged in a circle, ellipse, triangle, quadrilateral, pentagon, hexagon, or any polygonal shape. In some instances, the lights 108 are arranged near or at a top portion of the voice-controlled device 106.

Each of the lights 108 may include, for example, a light-emitting diode (LED), a fluorescent light, an incandescent light, a laser, a portion of a flat panel display (e.g., portion of an LCD screen), and so on. Further, each of the lights 108 may be configured to fluctuate in intensity and/or illuminate in one or more colors. In some instances, an application and/or user may specify that the lights 108 be illuminated in a particular color when the voice-controlled device 106 enters a particular operational state.

The voice-controlled device 106 is designed to support audio interactions with the user, in the form of receiving voice commands (e.g., words, phrase, sentences, etc.) from the user and outputting audible and/or visual feedback to the user. Accordingly, in the illustrated implementation, there are no haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons.

Several modules such as instruction, data stores, and so forth may be stored within the memory 204 and configured to execute on the processor 202. An operating system module 220 is configured to manage hardware and services (e.g., wireless unit, USB, Codec) within and coupled to the device 106 for the benefit of other modules.

In addition, the memory 204 may include a speech-recognition engine 222. The speech-recognition engine 222 may include a speech-recognition module, one or more language models, and/or a training module. The speech-recognition module may function to decode audio to identify sounds within the audio signal. The speech-recognition module may then identify character strings either spoken or spelled from the audio signal based on the identified sounds. The speech-recognition module may perform this speech recognition with reference to the one or more language models. In some instances, the voice-controlled device 106 utilizes a language model that is specifically designed to assist the speech-recognition module in identifying sounds corresponding to particular graphemes, such as letters, numbers, symbols, and/or the like. In addition, the speech-recognition engine 222 may utilize the training module to retrain the language model(s) or other language models based on interaction with a user.

In some embodiments, the memory 204 may also include a sound source locator module to determine a location or direction of a sound source relative to the device 106. The source locator module can use a variety of techniques including time-difference-of-arrival (TDOA), volume-difference-at-arrival (VDAA), beamforming, and so forth. TDOA represents the temporal difference between when the sound is detected at two or more microphones. VDAA represents the difference in the level of the sound at the time the sound is detected at two or more microphones.

The voice-controlled device 106 may also include a visual indication module 224 to cause the lights 108 to indicate an operational state of the voice-controlled device 106. That is, the visual indication module 224 may cause the lights 108 to illuminate in a particular manner associated with a state of operation of the voice-controlled device 106. For example, upon detecting a sound from a user, or generating an audio signal from the sound, the voice-controlled device 106 may illuminate the lights 108 to indicate to the user that the sound was detected. Thereafter, an analysis of the audio signal may determine a location of the user or a general direction from where the sound originates, and the lights 108 may be illuminated to indicate the location of the user (e.g., illuminating lights that are closest to the user or in the general direction of the user). After the audio signal is further analyzed to determine a command, the voice-controlled device 106 may begin performing the command and illuminate the lights 108 in a particular manner to indicate that the command is being performed.

A few operational states that the voice-controlled device 106 may enter include:

Inactive state—the voice-controlled device 106 is in a sleep mode in which minimal, if any, processing is being performed. In one example, this state is indicated by not illuminating any lights of the device 106.

Active state—the voice-controlled device 106 is awake and preparing to perform speech recognition (e.g., receive audio). In some instances, a predetermined utterance may awake the voice-controlled device 106 from an inactive state, and thereafter, the voice-controlled device 106 (in the active state) may wait to receive a further utterance requesting the device 106 to perform an operation.

A power-on state—the voice-controlled device 106 is plugged-in and/or turned on.

A power-off state—the voice-controlled device 106 is not plugged-in and/or is turned off A state in which the voice-controlled device 106 is performing speech recognition (e.g., receiving and processing an audio signal).

A state in which the voice-controlled device 106 is tracking a source of sound associated with the audio signal (e.g., determining a location of a user and following the user).

A state in which a microphone of the voice-controlled device 106 is turned off (e.g., muted). In one example, this state is indicated by illuminating one or more lights in a predetermined color (e.g., red).

A state in which the voice-controlled device 106 is processing an audio signal to determine a location of a source of sound associated with the audio signal.

A state in which the voice-controlled device 106 is unable to identify (e.g., decode, recognize) an utterance from an audio signal. That is, the device 106 may identify an error due to an inability of the device 106 to identify the utterance. In some instances, this state may be entered when an audio signal includes both an utterance from a user and noise from an interfering source. In one example, an illuminated or non-illuminated segment of the lights of the device 106 may move to a location around the perimeter of the device 106 that is closest to the interfering source while another illuminated or non-illuminated segment remains fixated to a location around the perimeter of the device 106 that is closest to the user.

A state in which the voice-controlled device 106 is adjusting volume of the voice-controlled device 106 (e.g., increasing or decreasing volume). In some instance, the volume may be adjusted by using a button on the voice-controlled device 106 and/or by receiving spoken input.

A state in which the voice-controlled device 106 is determining or authenticating an identity of a user.

A state in which the voice-controlled device 106 has determined an identity of a user. In some instances, one or more lights of the device 106 may be illuminated to indicate the identity of the user. For instance, when the device 106 indicates any of the operational states described herein, the device 106 may illuminate in different colors for different users (e.g., the device 106 illuminates in red patterns for Jim and illuminates in pink patterns for Michelle). In some instances, the color may be a customized color selected by a user.

A state in which the voice-controlled device 106 is connecting to a network.

A state in which the voice-controlled device 106 is updating software and/or transferring data to or from the voice-controlled device 106. In one example, this state may be indicated by illuminating adjacent segments of one or more lights of the device 106 to increase a length of a portion of the one or more lights that is illuminated.

A state in which an error has occurred, such as a hardware/software error on the voice-controlled device 106, a communication error from an inability to communicate with another device (e.g., cloud computing device providing functionality for the device 106, device in the environment 102, etc.), an error on a remote computing device (e.g., cloud computing device), and so on. In one example, one or more lights of the device 106 may be illuminated in a predetermined pattern and/or color that is associated with the error. Different types of errors may be associated with different patterns and/or colors to indicate to the user the type of error. In one example, the user may reference a diagnostic chart associated with the different patterns and/or colors to determine the type of error.

A state in which an application is running on the voice-controlled device 106 (e.g., third party application). In one example, one or more lights of the device 106 may be illuminated in a predetermined color or pattern that is associated with the application.

A state in which the voice-controlled device 106 is searching a database, outputting content, performing personal management operations, shopping online, performing a financial transaction, etc.

As described below, the voice-controlled device 106 may illuminate the lights 108 in an array of different patterns and colors in response to entering an operational state. By illuminating the lights 108 in this manner, the device 106 provides feedback to a user regarding the current state of the device. While a few examples have been provided, it is to be appreciated that the voice-controlled device 106 may enter any other number of operational states. Further, it should also be appreciated that the voice-controlled device 106 may be in one or multiple operational states at a same time.

Illustrative Visual Indications

FIGS. 3-10 illustrate various visual indications that the voice-controlled device 106 may implement to provide feedback to the user 104 that the device is entering an operational state, such as powering on, processing speech, or the like. While each of these example visual indications is described with respect to a particular operational state of the voice-controlled device 106, it is to be appreciated that the different visual indications may be used for any other operational states. Furthermore, each of the visual indications may incorporate any color of light or variety of light colors. In some examples described herein, the device 106 may enter an operational state upon detecting a sound from a user or device, while in other examples the device 106 may enter an operational state upon selecting a button on the device 106, upon termination of an operation or process on the device 106, or otherwise.

Each of these processes may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Figure 3:
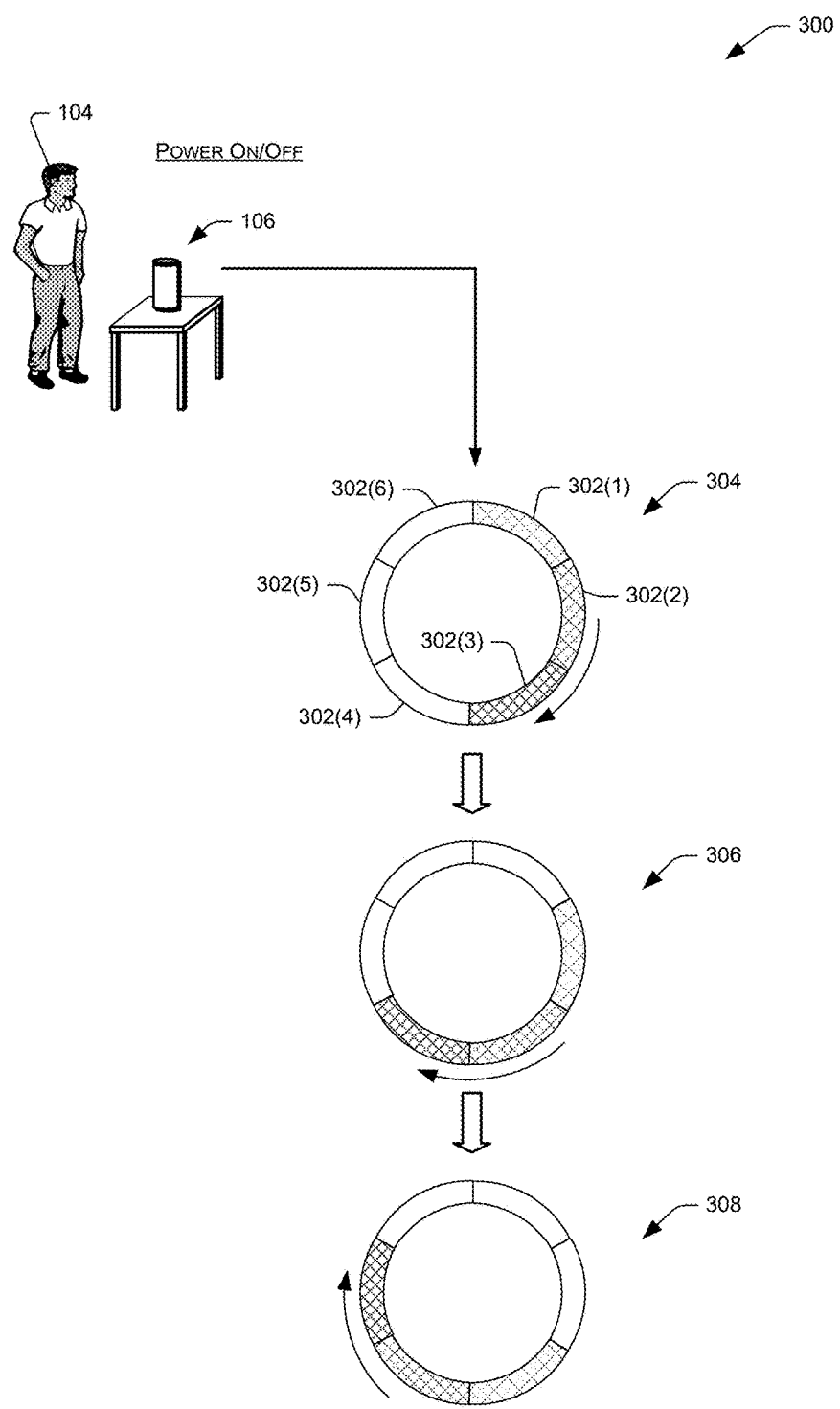
FIG. 3 illustrates an example visual indication that a voice-controlled device may implement in response to a user powering on or off the device.

FIG. 3 illustrates an example visual indication 300 that the voice-controlled device 106 may implement in response to the user 104 powering on (or off) the device 106. For instance, the user 104 may activate a physical power switch to power on or off the device 106, may provide a voice command, or may power on or off the device in any other manner.

Generally, in one example the lights of the voice-controlled device 106 may illuminate around the perimeter of the device 106 in a predefined manner, such as clockwise or counterclockwise. For instance, a first light may be illuminated, after which a second, adjacent light may be illuminated, after which a third light that is adjacent to the second light may be illuminated, and so forth. Furthermore, the trailing end of the illumination may be turned off as the illumination travels around the perimeter. For instance, the first light may be turned off when the second or third light is turned on. As such, the voice-controlled device 106 may provide a sense of the light traveling around the perimeter of the device while the device is powering on or off. Of course, while this example describes discrete lights, it is to be appreciated the "first," "second," and "third" lights may be different segments of a single integrated light, as discussed above.

In addition to illuminating and turning off adjacent lights as described immediately above, the techniques may also vary the intensity of the lights as the illumination moves around the perimeter of the voice-controlled device 106. For instance, a first light may be illuminated at "full" intensity, and thereafter a second, adjacent light may be illuminated at full intensity while the first light becomes illuminated at two-thirds intensity. Thereafter, a third light (adjacent to the second light) may be illuminated at full intensity, while the second light is turned down to two-thirds intensity and the first light is turned down to one-third intensity. Next, a fourth light (adjacent to the third light) may be illuminated at full intensity, while the third light may be turned down to two-thirds intensity, the second light turned down to one-third intensity, and the first light may be turned off all together. This may continue as the illumination moves around the perimeter of the voice-controlled device 106. As such, the visual indication may resemble a bright light having a fading tail moving around the perimeter.

Turning to the illustration, in this example the voice-controlled device 106 includes six segments 302(1), 302(2), 302(3), 302(4), 302(5), and 302(6), which may comprise discrete lights or may comprise different portions of a single integrated light (or any combination there between). At 304, the voice-controlled device 106 has received a request to power on or off and, in response, the first segment 302(1) is illuminated a first intensity, while the second segment is illuminated with a second, greater intensity, and the third segment 302(3) is illuminated with a third, even greater intensity. Next, at 306, the fourth segment 302(4) is illuminated with the third intensity, the third segment 302(3) is illuminated with the second, lesser intensity, and the second segment 302(2) is illuminated with the first, even lesser intensity. The first segment 302(1), meanwhile, is not illuminated at this point. Finally, at 308, the fifth segment 302(5) is illuminated at the third intensity, the fourth segment 302(4) at the second intensity, and the third segment 302(3) at the first intensity. The first and second segments, meanwhile, are not illuminated. FIG. 3 thus illustrates the concept of an illumination traveling around the perimeter of the device 106 and trailing off at the back end of the illumination.

While a few portions of the example visual indication 300 have been illustrated, it is to be appreciated that this visual indication may continue and the illumination may continue "around" the perimeter of the voice-controlled device 106 while in the power on/off operational state. In some instances, the color scheme may change each time the illumination makes a complete loop around the perimeter of the device 106. To illustrate, if a segment is illuminated in a first color a first time around the perimeter, the segment may be illuminated in a second color a second time around the perimeter.

Furthermore, while the example visual indication 300 is illustrated as including segments that vary in intensity, these techniques may similarly apply to varying colors. For example, at 304, the first segment 302(1) is illuminated in a first color (e.g., yellow), while the second segment 302(2) is illuminated with a second color (e.g., orange), and the third segment 302(3) is illuminated with a third color (e.g., red). At 306, the fourth segment 302(4) is illuminated with the third color, the third segment 302(3) is illuminated with the second color, and the second segment 302(2) is illuminated with the first color. Finally, at 308, the fifth segment 302(5) is illuminated in the third color, the fourth segment 302(4) in the second color, and the third segment 302(3) in the first color.

Figure 4:
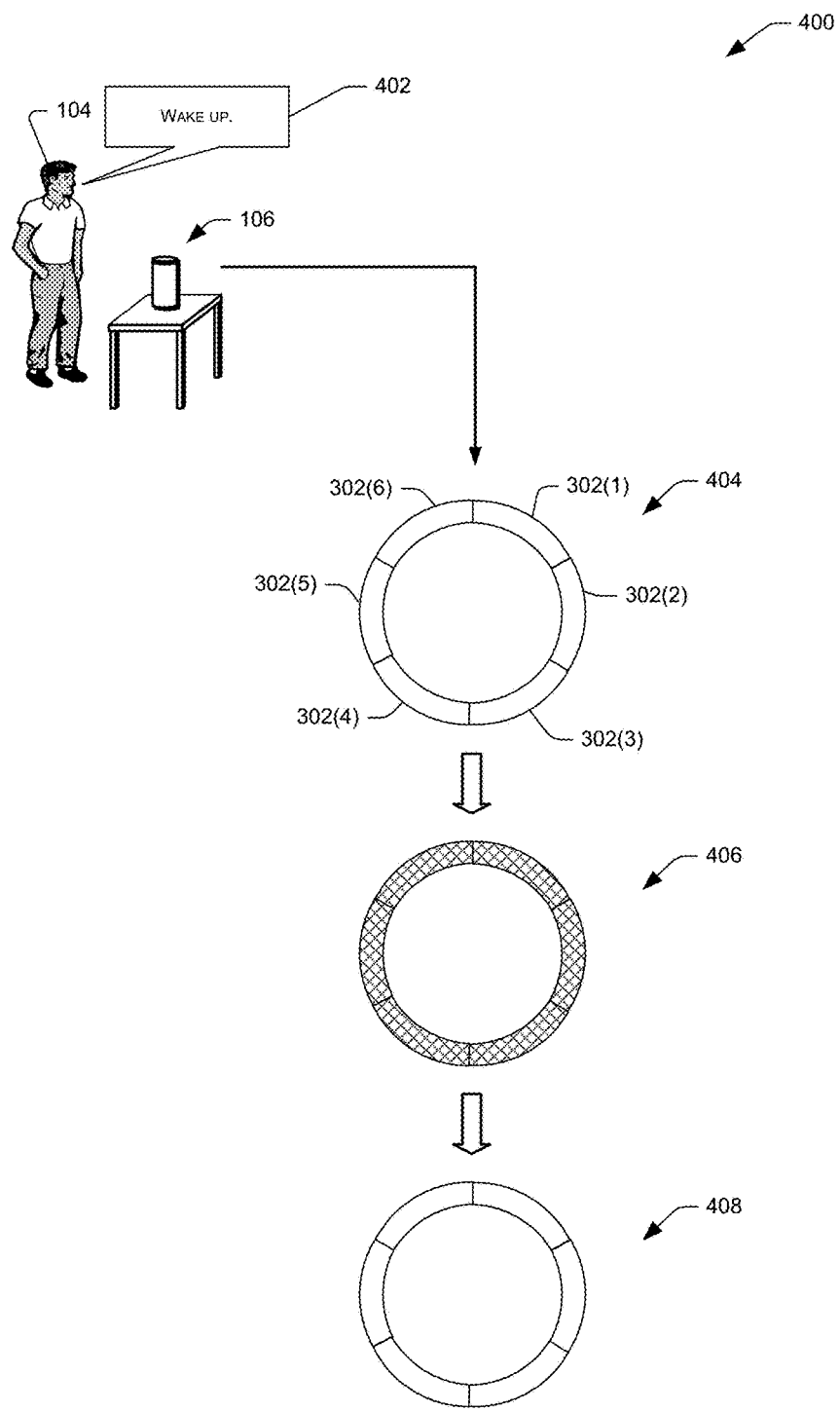
FIG. 4 illustrates an example visual indication that a voice-controlled device may implement in response to a user requesting that the voice-controlled device "wake up" via an audible command.

FIG. 4 illustrates an example visual indication 400 that the voice-controlled device 106 may implement in response to the user 104 requesting that the voice-controlled device 106 "wake up" via an audible command 402. In other words, the speech recognition engine of the device 106 may listen for a certain word(s) that, when uttered by the user, informs the device 106 that the user 104 is preparing to input an audible command. As such, the voice-controlled device 106 may enter an initialization state in response to the user 104 uttering the phrase "wake up" and may begin listening for a command from the user.

In addition to entering this operational state where the device 106 is actively listening for an audible command, the device 106 may illuminate the lights in a predefined pattern to indicate this operational state to the user 104. For instance, at 404, each of the segments 302(1)-(6) may initially be turned off. At 406, meanwhile, each segment may be illuminated and, at 408, each segment may again be powered off. As such, the voice-controlled device 106 may essentially blink on and then off to indicate to the user 104 that the device 106 is prepared to receive audible commands from the user 104.

Figure 5A:
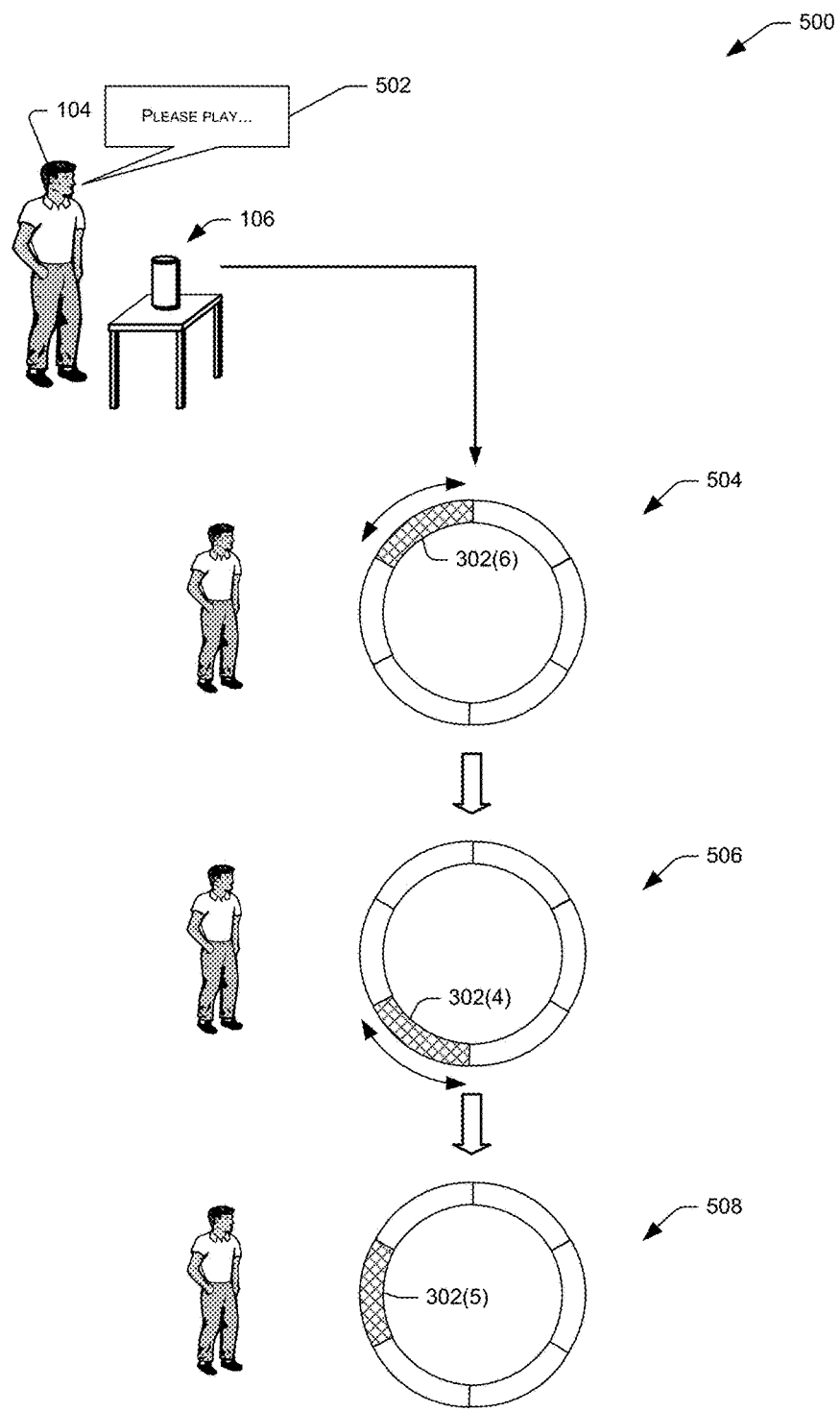
FIG. 5A illustrates an example visual indication that a voice-controlled device may utilize when a user begins stating a command.

FIG. 5A illustrates an example visual indication 500 that the voice-controlled device 106 may utilize when the user 104 begins stating a command (e.g., after waking up the device 106 as shown in FIG. 4). As illustrated, the user 104 begins to issue an audible command 502 stating "Please play . . . ."

In response, the voice-controlled device 106 may attempt to determine a location or direction of a source of the audio signal and then visually indicate the location or direction with use of one or lights. In one example, the voice-controlled device 106 utilizes time-of-flight techniques, beamforming techniques, or any other techniques to estimate a location of the user within the room. The location may represent an estimated location in three-dimensional space, two-dimensional space, or a direction from the device 106 and/or distance from the device 106. The device 106 may then fixate the illumination on the segment of the light(s) that is nearest to the user, thus indicating to the user 104 that the device 106 is now actively listening to the user 104.

At 504, when the user 104 first begins his command ("Please play . . . ") the device 106 begins tracking and honing in the on the location of the sound source (here, the user 104). As such, the device 106 initially illuminates the segment 302(6) before illuminating the segment 302(5) (not shown) and then the segment 302(4) at 506. Finally, the illumination settles in, at 508, at the segment 302(5), which is the segment that is closest to the user 104. In instances where two segments are relatively equidistance from the sound source (e.g., the user 104), the voice-controlled device 106 may illuminate both segments. In either instance, by lighting up the light segment(s) closest to the user 104, the device 106 indicates to the user 104 that the device 106 is listening to the user 104. In some instances, as the user 104 changes locations, an illuminated segment may move around the perimeter of the device 106 to a segment that is closest to the changed location of the user 104.

Figure 5B:
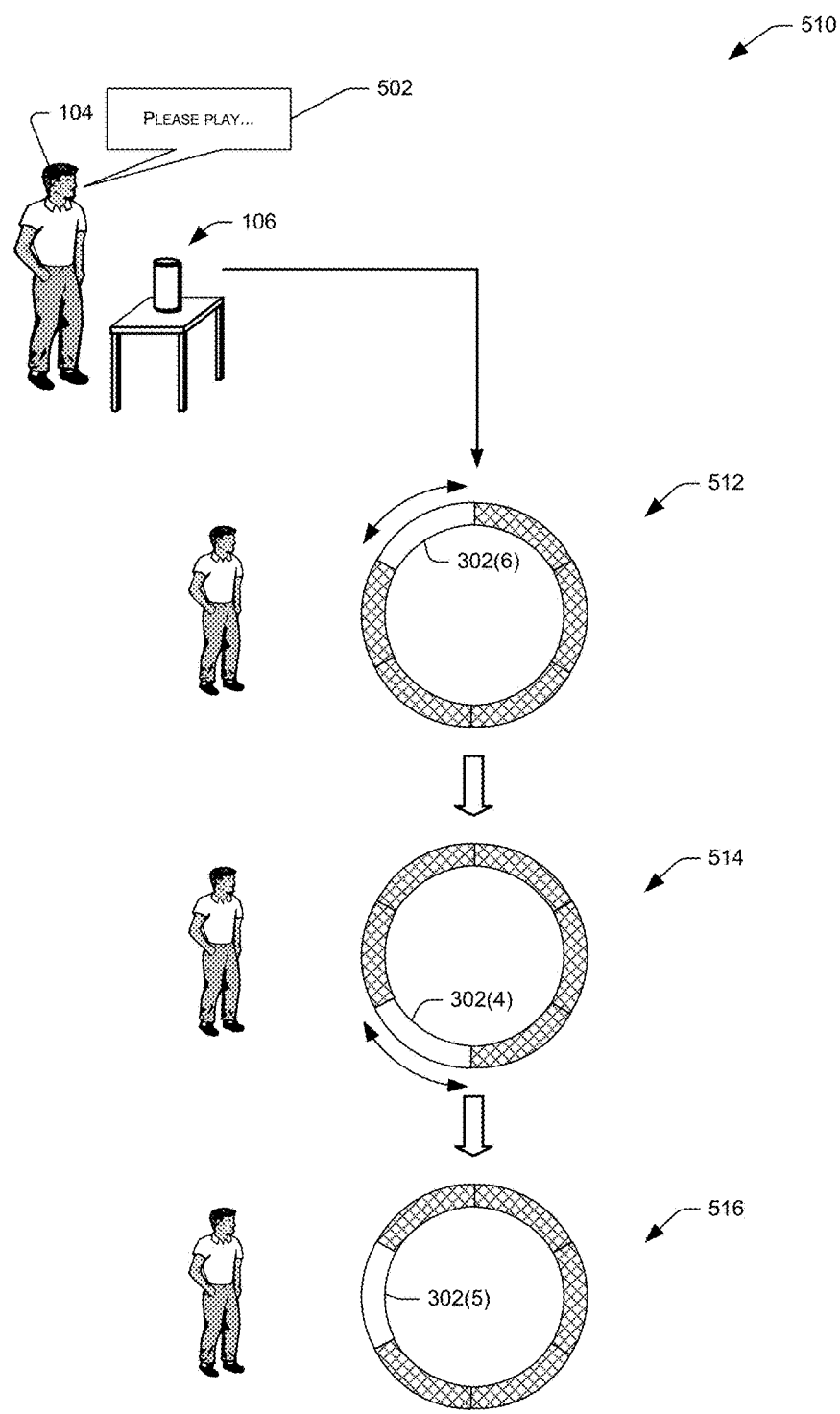
FIG. 5B illustrates an example visual indication in response to a user issuing an audible command.

FIG. 5B illustrates an alternative visual indication 510 in response to the user 104 issuing the audible command 502. Here, instead of illuminating the light segment closest to the user 104, the device 106 eventually illuminates each light segment other than the segment closest to the user 104. As such, at 512, the device 106 initially illuminates each segment other than the segment 302(6), then each segment other than the segment 302(5) (not shown), then each segment other than the segment 302(4) at 514. Finally, the device 106 illuminates each segment other than the segment 302(5) at 516. As such, the non-illuminated light segment eventually settles in as the light segment closest to the user uttering the audible command 502, again informing the user 104 that the device 106 is actively listening to the user 104.

Figure 6A:
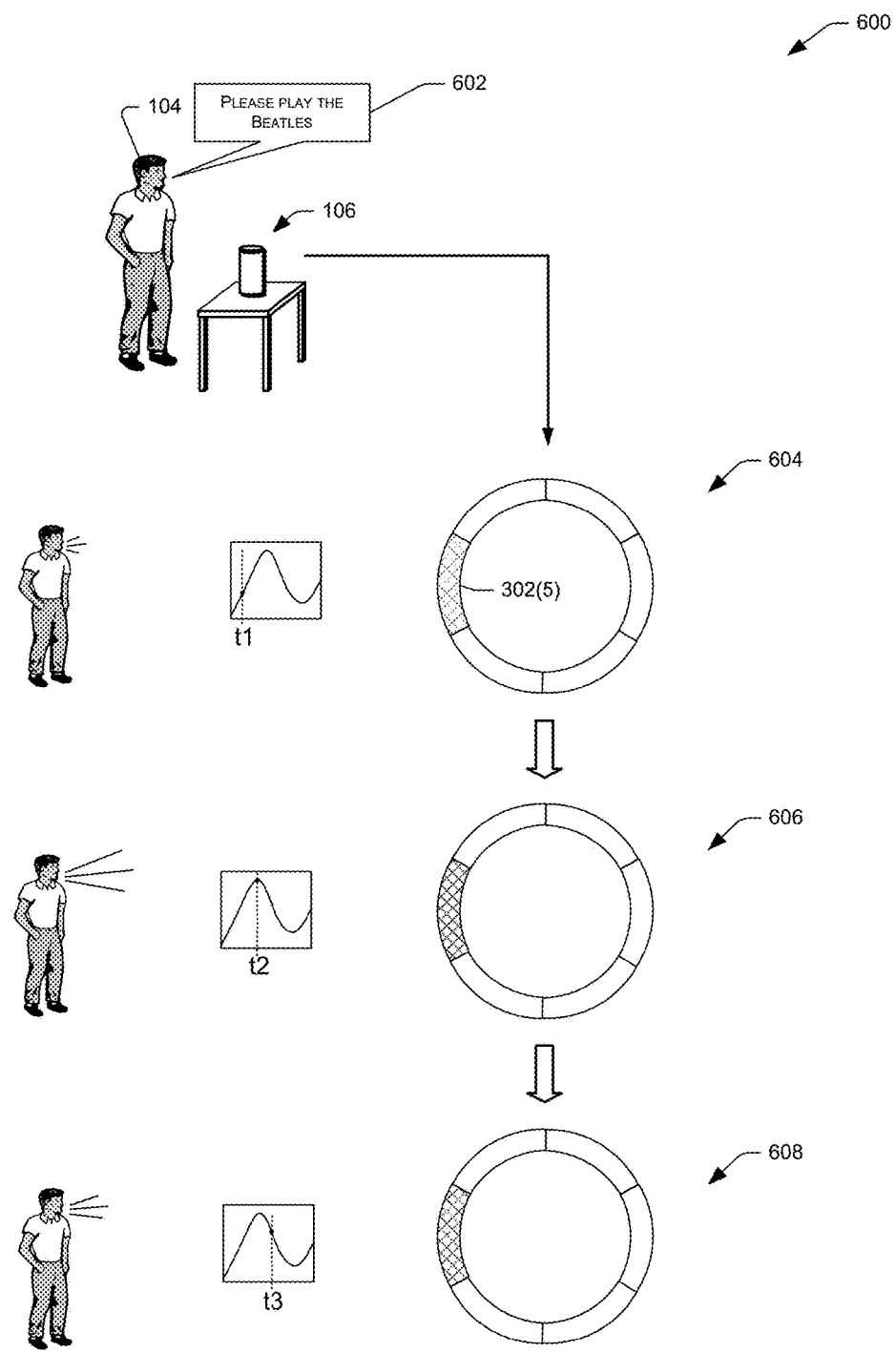
FIGS. 6A-6B illustrate example visual indications that a voice-controlled device may implement in response to an audible command.

FIG. 6A illustrates an example visual indication 600 in response to the user 104 issuing an audible command 602, which is the continuation of the audible command 502. Here, the user 104 requests that the device 106 "please play the Beatles." Once the device 106 has located the sound source as described above with reference to FIGS. 5A-5B, the voice-controlled device 106 may vary an intensity of the illumination of one or more light segments according to amplitude (e.g., volume, frequency, etc.) of the user's utterance. At 604 (time t1), for instance, the light segment 302(5) that is illuminated has a relatively low intensity (e.g., 30%) given the amplitude of the user's utterance at the moment (as illustrated by the amplitude of the sinusoidal signal at time t1). As the amplitude of that command increases, as shown at 606 (time t2), the device 106 may increase the intensity of the illumination (e.g., 100%). Furthermore, as the amplitude of the utterance decreases, as shown at 608, the intensity of the illumination may decrease (e.g., 70%). Therefore, the intensity of the illumination may vary along with the user's speech, again indicating that the voice-controlled device 106 is "hearing" the user's command.

Figure 6B:
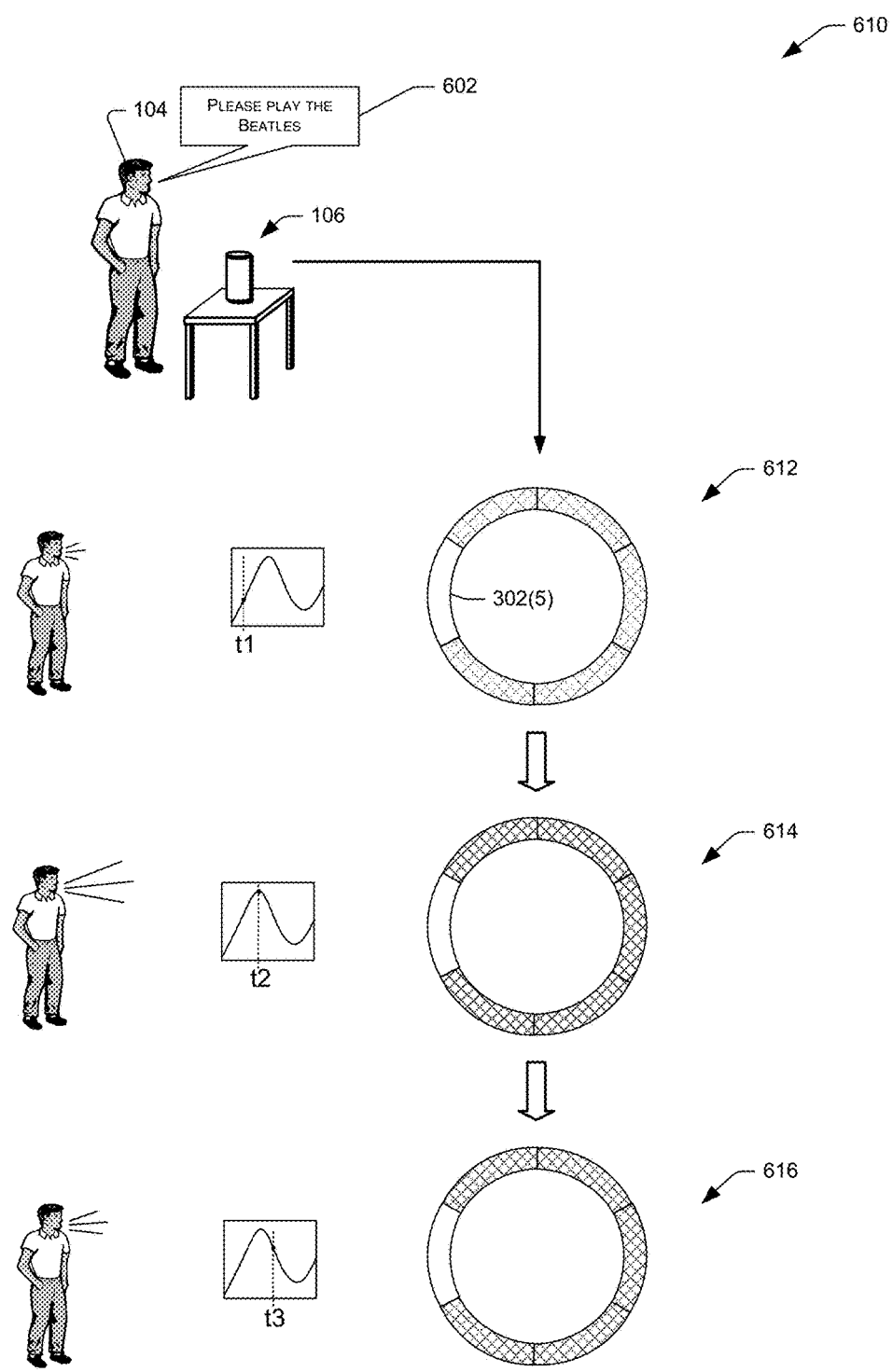

FIG. 6B illustrates another example visual indication 610 that the device 106 may implement as the user 104 issues the audible command 602. Here, the device 106 again varies the intensity of the illumination in unison with the amplitude of the user's utterance. Here, however, the device 106 illuminates each segment other than the segment 302(5) closest to the user 104. As such, at 612 (time t1), the device 106 illuminates every other segment at a relatively low intensity (e.g., 30%) while refraining from illuminating the segment 302(5) at all, in correspondence with the user's current speech. At 614 (time t2), however, the device 106 increases the intensity (e.g., 100%) as the amplitude of the user's speech increases. Finally, at 616, the device 106 decreases the intensity (e.g., 70%) in accordance with the user's speech.

Although FIGS. 6A-6B illustrate example visual indications 600 and 610 that may vary in intensity with an amplitude of sound input from the user 104, these techniques may similarly apply to other types of input/output sound. For instance, the device 106 may vary the intensity of an illumination in unison with the amplitude of sound that is output from the device 106, such as a response to a user that is output through the speaker 208 of the device 106, audible content that is output through the speaker 208, and so on. In some examples, the sound (e.g., in the form of an audio signal) here may be sent from a device in a cloud computing environment to be output on the device 106. Additionally, or alternatively, the device 106 may vary the intensity of an illumination in unison with sound from an electronic device (e.g., cell phone or tablet device) which is attempting to audibly communicate with the device 106.

Moreover, in some instances the example visual indications 600 and 610 of FIGS. 6A-6B may alternatively, or additionally, vary in color with amplitude of input/output sound. In returning to FIG. 6A, at 604, for instance, the light segment 302(5) may be illuminated with a particular color that is associated with a range of amplitude (e.g., yellow) in which the user's utterance is found. As the amplitude of the user's utterance increases outside the range, as shown at 606, the device 106 may change the illumination to a different color (e.g., red). Furthermore, as the amplitude of the utterance decreases, as shown at 608, the illumination may be changed again to a further color (e.g., orange). In some examples, the intensity of the illumination may also vary as the amplitude of the utterance changes. To illustrate, as the amplitude of the command at 604 increases from a lower end of a particular range to an upper end of the particular range, the intensity of an illuminated color may vary.

Figure 7A:
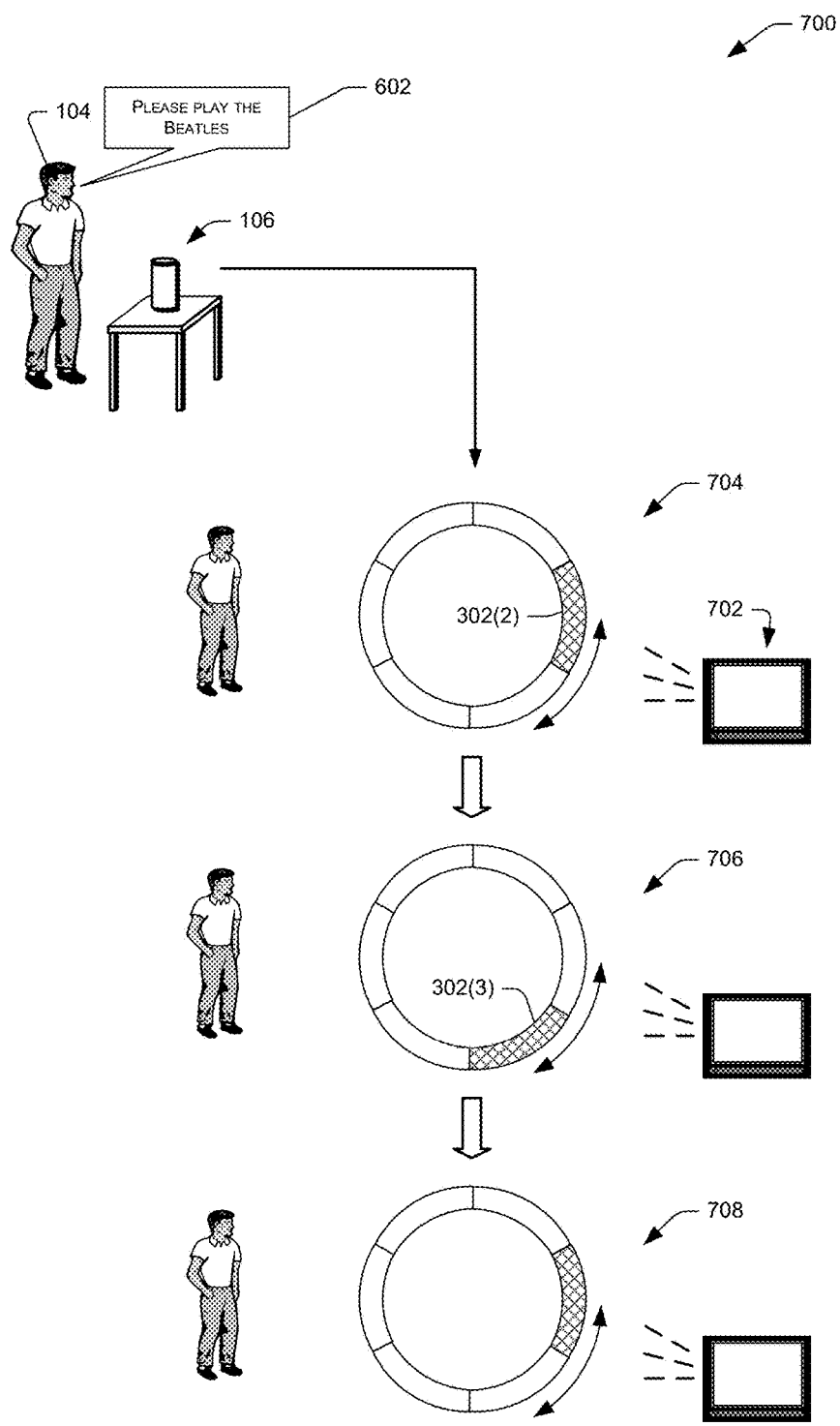
FIGS. 7A-7D illustrate example visual indications that a voice-controlled device may implement when a user issues an audible command, but noise from an interfering source exists.

FIG. 7A illustrates an example visual indication 700 that the voice-controlled device 106 may implement when the user 104 issues the audible command 602, but noise from an interfering source 702 exists. As described with reference to an example below, the device 106 may indicate to the user 104 when noise from an interfering source makes it difficult for the device 106 to perform speech recognition on the user's speech (i.e., decode the utterance of the user 104). That is, the device 106 may utilize the light(s) for the purpose of indicating the presence of the interfering noise to the user 104.

In one example, the device 106 may call attention to the interfering source 702 by locating the interfering source 702 using the techniques described above (e.g., time-of-flight techniques, etc.) and then alternatively illuminating multiple segments in the direction of the source 702. At 704, for instance, the device 106 has located the direction of the interfering source 702 and has accordingly illuminated the segment 302(2). Next, at 706, the device 106 illuminates the segment 302(3). Finally, at 708, the device 106 again illuminates the segment 302(2). The device 106 may oscillate between illuminating these two segments for a predetermined time or until the user 104 increases the volume of his command and/or decreases the noise from the interfering source 702, thus enabling the speech recognition to decode the utterance. Furthermore, in some instances the device 106 may also illuminate the light segment closest to the user 104, as discussed above with reference to FIGS. 5A and 6A.

Figure 7B:
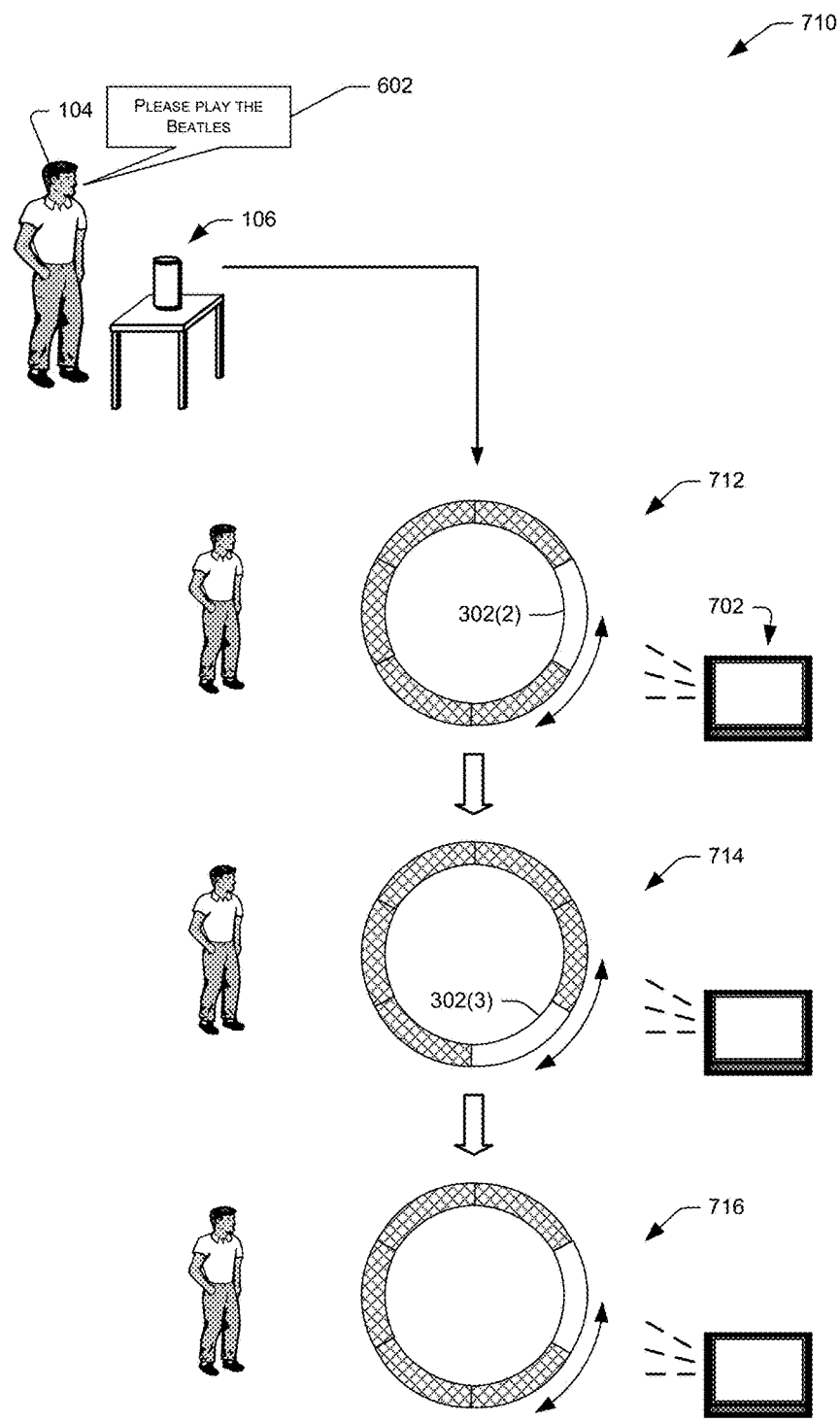

FIG. 7B illustrates an alternative visual indication 710 that the device 106 may utilize when noise from the interfering source 702 makes speech recognition difficult. Here, the device 106 may illuminate each segment other than the segments closest to the interfering source 702 and may oscillate between refraining from illuminating the segments closest to the source 702.

At 712, for instance, the voice-controlled device 106 illuminates each segment other than the segment 302(2). At 714, the device 106 illuminates each segment other than the segment 302(3). Finally, at 716, the device 106 illuminates each segment other than the segment 302(2). Again, the device 106 may continue illuminating the lights in this manner for a predetermined amount of time or until the user 104 increases the volume of his command and/or decreases the noise from the interfering source 702. Furthermore, in some instances the device 106 may also refrain from illuminating the light segment closest to the user 104, as discussed above with reference to FIGS. 5B and 6B.

Figure 7C:
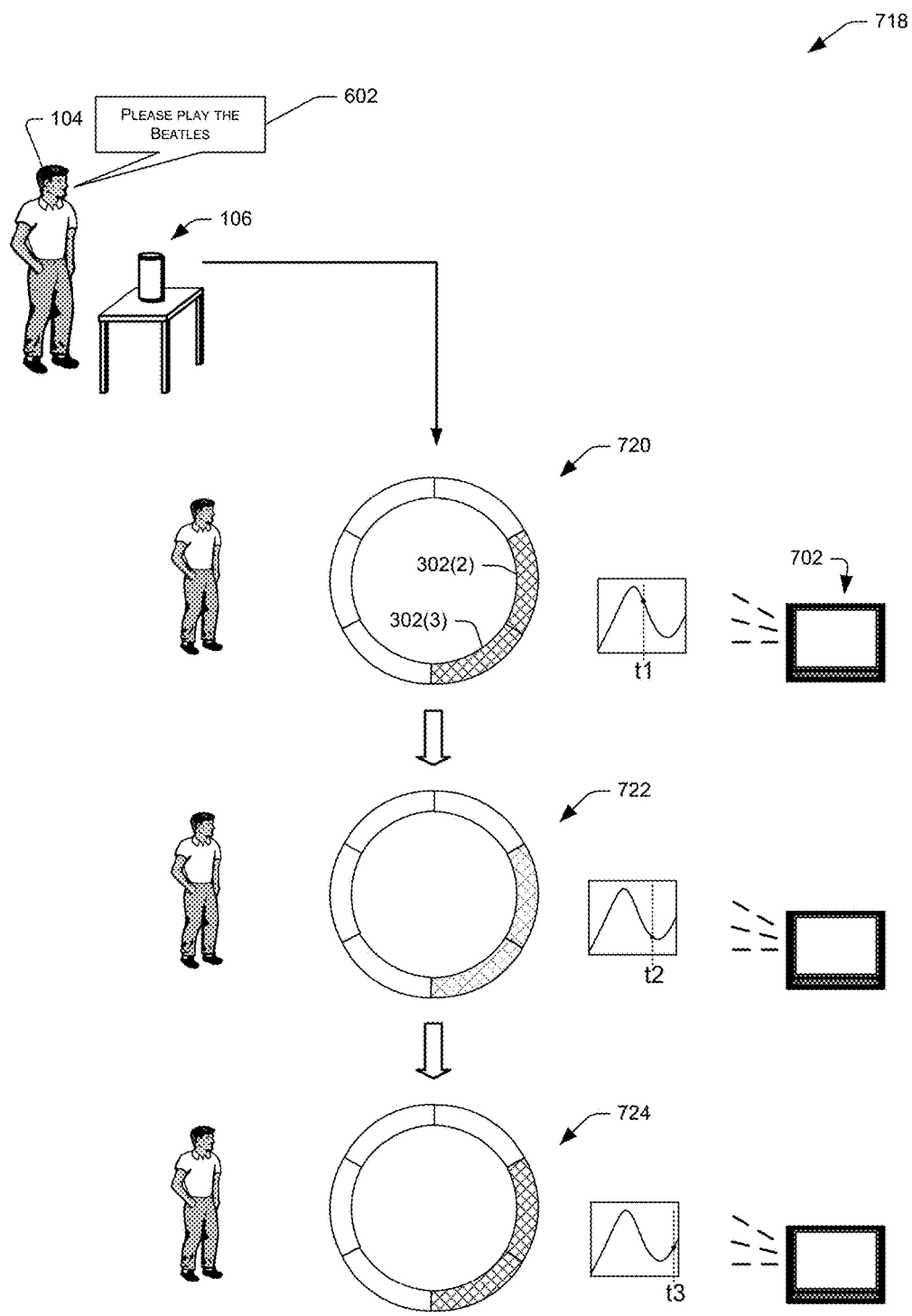

FIG. 7C illustrates yet another alternative visual indication 718 that the device 106 may utilize when noise from the interfering source 702 makes speech recognition difficult. Here, the device 106 alters the intensity of the illumination at the segment(s) closest to the interfering source 702 to indicate the presence of the source 702 to the user 104.

At 720 (time t1), for instance, the voice-controlled device 106 has illuminated the segments 302(2) and 302(3) closest to the interfering source 702, while refraining from illuminating the remaining segments. At 722 (time t2), the device 106 has lessened the intensity of the illumination and, at 724 (time t3), the device 106 has again increased the intensity of the illumination. The variation in the intensity may vary with amplitude of the noise from the source 702 or may be a constant variance. In either instance, the device 106 essentially blinks at the interfering source 702 to indicate the presence of the source to the user 104. In some instances, the device 106 may also illuminate the light segment closes to the user 104, as discussed above with reference to FIGS. 5A and 6A.

Figure 7D:
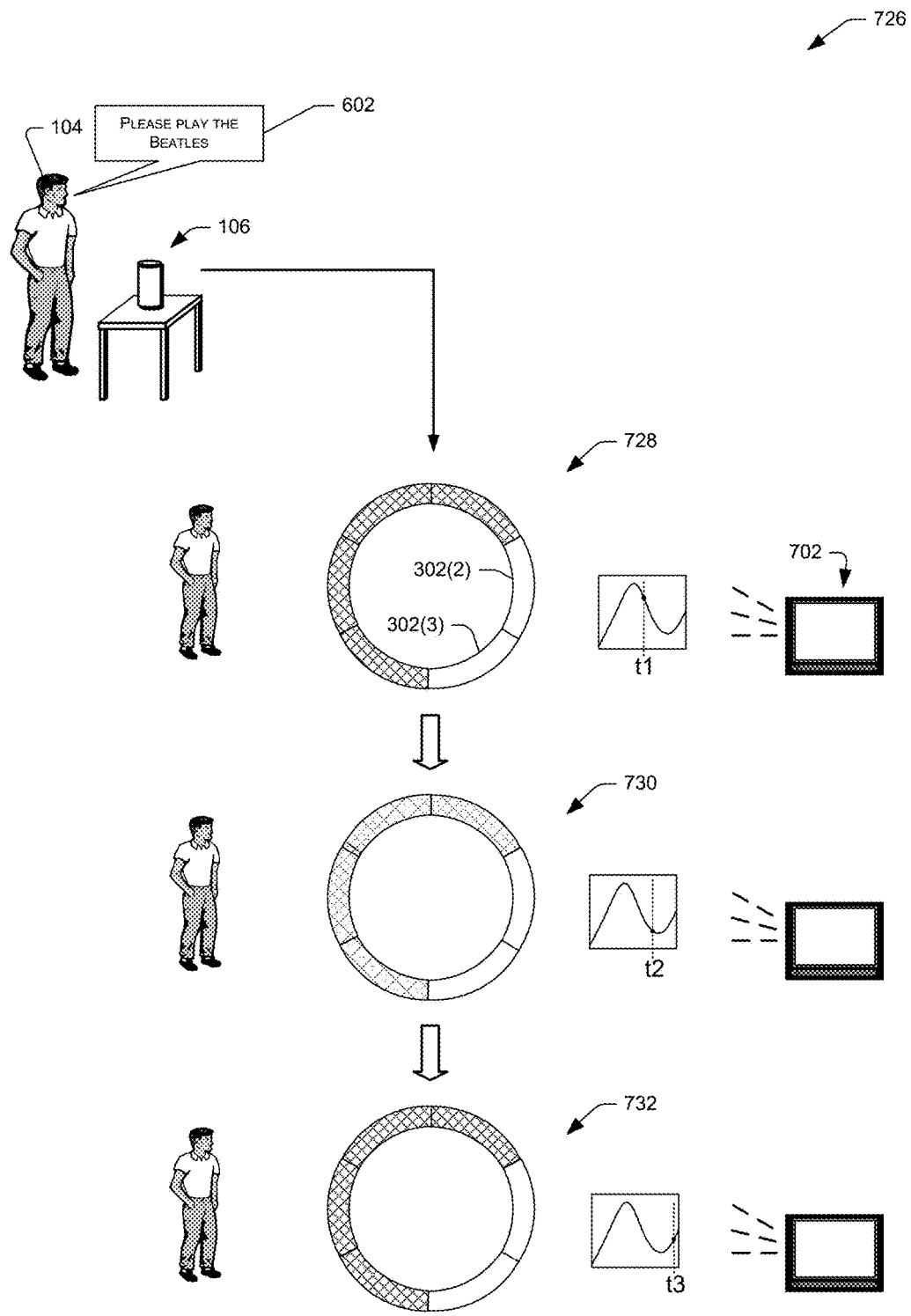

FIG. 7D illustrates yet another alternative visual indication 726 that the device 106 may utilize when noise from the interfering source 702 makes speech recognition difficult. Here, the device 106 alters the intensity of the illumination at each segment other than the segment(s) closest to the interfering source 702 to indicate the presence of the source 702 to the user 104.

At 728 (time t1), for instance, the voice-controlled device 106 has illuminated each segment other than the segments 302(2) and 302(3) closest to the interfering source 702. At 730 (time t2), the device 106 has lessened the intensity of the illumination and, at 732 (time t3), the device 106 has again increased the intensity of the illumination. The variation in the intensity may vary with amplitude of the noise from the source 702 or may be a constant variance. In either instance, the device 106 essentially blinks at each segment other than the segment(s) closest to the interfering source 702 to indicate the presence of the source to the user 104. In some instances, the device 106 may also refrain from illuminating the light segment closest to the user 104, as discussed above with reference to FIGS. 5B and 6B.

Although the example visual indications 718 and 726 of FIGS. 7C and 7D vary intensity with amplitude of the interfering source 702, the visual indications 718 and 726 may alternatively, or additionally, vary color with amplitude of the interfering source 702, similar to the examples described above in reference to FIGS. 6A-6B.

Figure 8:
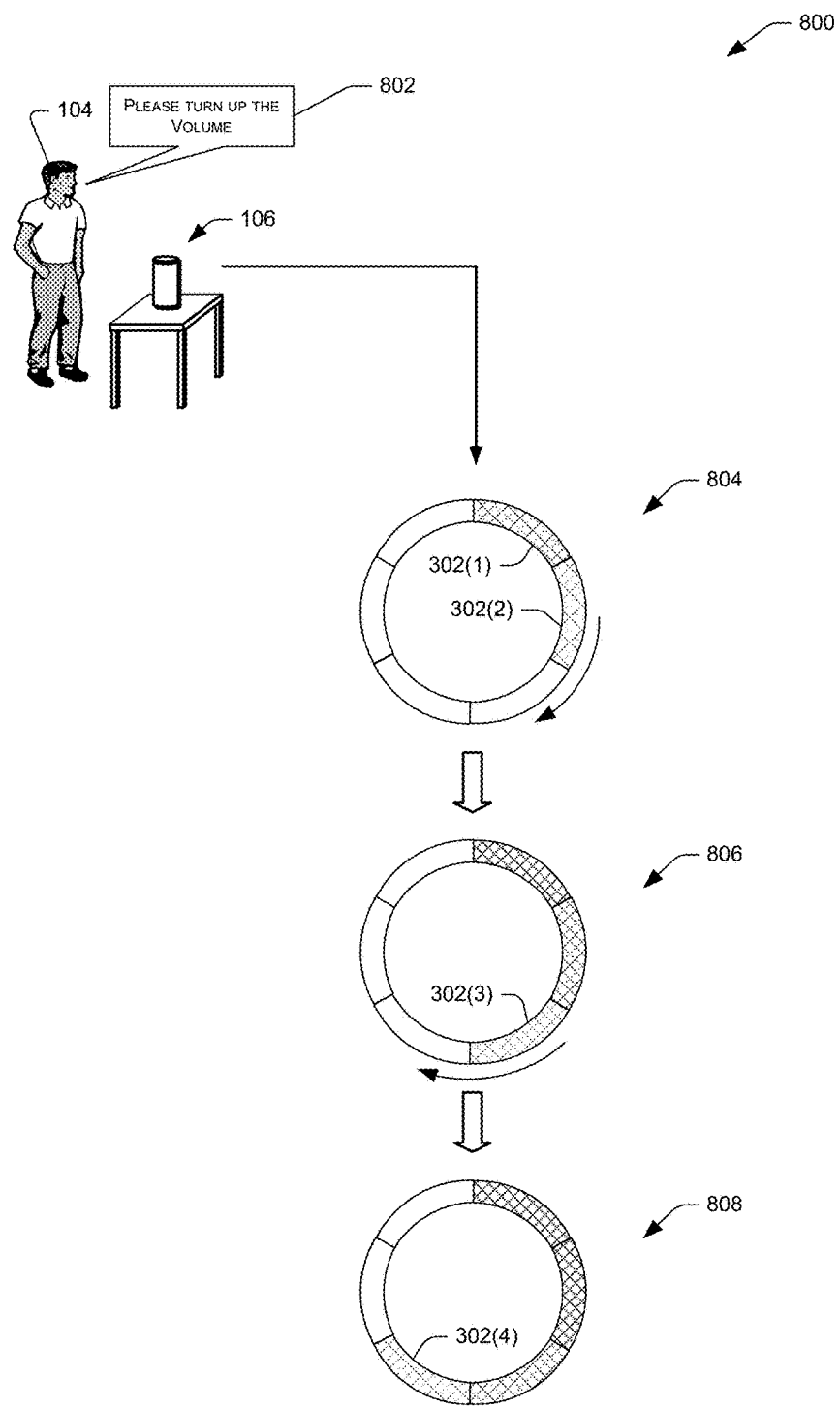
FIG. 8 illustrates an example visual indication that a voice-controlled device may implement when a user issues an audible command requesting that the device turn up the volume of a speaker of the device or another device.

FIG. 8 illustrates an example visual indication 800 that the voice-controlled device 106 may implement when the user 104 issues an audible command 802 requesting that the device 106 turn up the volume of the device 106 or another device that the device 106 controls. At a high level, when indicating to the user 104 that the volume is being increased, the device 106 may illuminate a greater and greater length of the light(s) around the perimeter of the device 106 and/or may increase the intensity of the illumination in some or all of the lights. The device 106 may perform the opposite operations in response to receiving a request to turn down the volume.

For instance, if the volume were at zero, and the user 104 subsequently requested via the command 802 to turn up the volume, the device 106 may initially illuminate the first segment 302(1). Furthermore, the device 106 may begin at a low level of intensity and then continually (e.g., linearly) increase the intensity of the illumination as the volume increase until the segment 302(1) reaches its maximum intensity or a threshold intensity that is less than the maximum. Then, the device 106 may perform the same operation to the adjacent segment 302(2), and so forth. As such, when the volume eventually reaches its maximum, each segment 302(1)-302(6) may be fully illuminated.

The example indication 800, for instance, illustrates at 804 that the first segment 302(1) is fully illuminated and the second segment 302(2) is partially illuminated when the user 104 issues the audible command 802. At 806, the volume has increased and the voice-controlled device 106 has now fully illuminated the second segment 302(2) and has partially illuminated the third segment 302(3). Finally, at 808, the device 106 has ceased increasing the volume but has fully illuminated the third segment 302(3) (along with the first two segments) and has partially illuminated the fourth segment 302(4). As such, the device 106 has provided a visual indication to the user 104 showing the increase in volume requested by the user 104.

In some instances, the device 106 may utilize different colors for each segment to indicate that the volume of the device 106 is being increased/decreased. For example, segments that are illustrated in FIG. 8 as being illuminated with relatively low intensity may be illuminated with a first color, segments illuminated with a higher intensity may be illuminated with a second color, and segments with an even higher intensity may be illuminated in a third color. As such, a segment may change between multiple colors before an additional segment is illuminated.

Further, in some examples the device 106 may utilize a different color each time an entirety of the segments are illuminated (e.g., after each of the segments is illuminated from 302(1) to 302(6) in a clockwise direction). For instance, a first color may be utilized to illuminate each of the segments a first time around the perimeter of the device 106 and a second color may be used the second time around. Here, the intensity of each segment may additionally be changed before an adjacent segment is illuminated, as discussed above.

Although the example visual indication 800 of FIG. 8 is described in reference to changing volume of the device 106, the visual indication 800 may additionally, or alternatively, be used when other operations are being performed, such as updating software on the device 106, transferring data to or from the device 106, and so on.

Figure 9A:
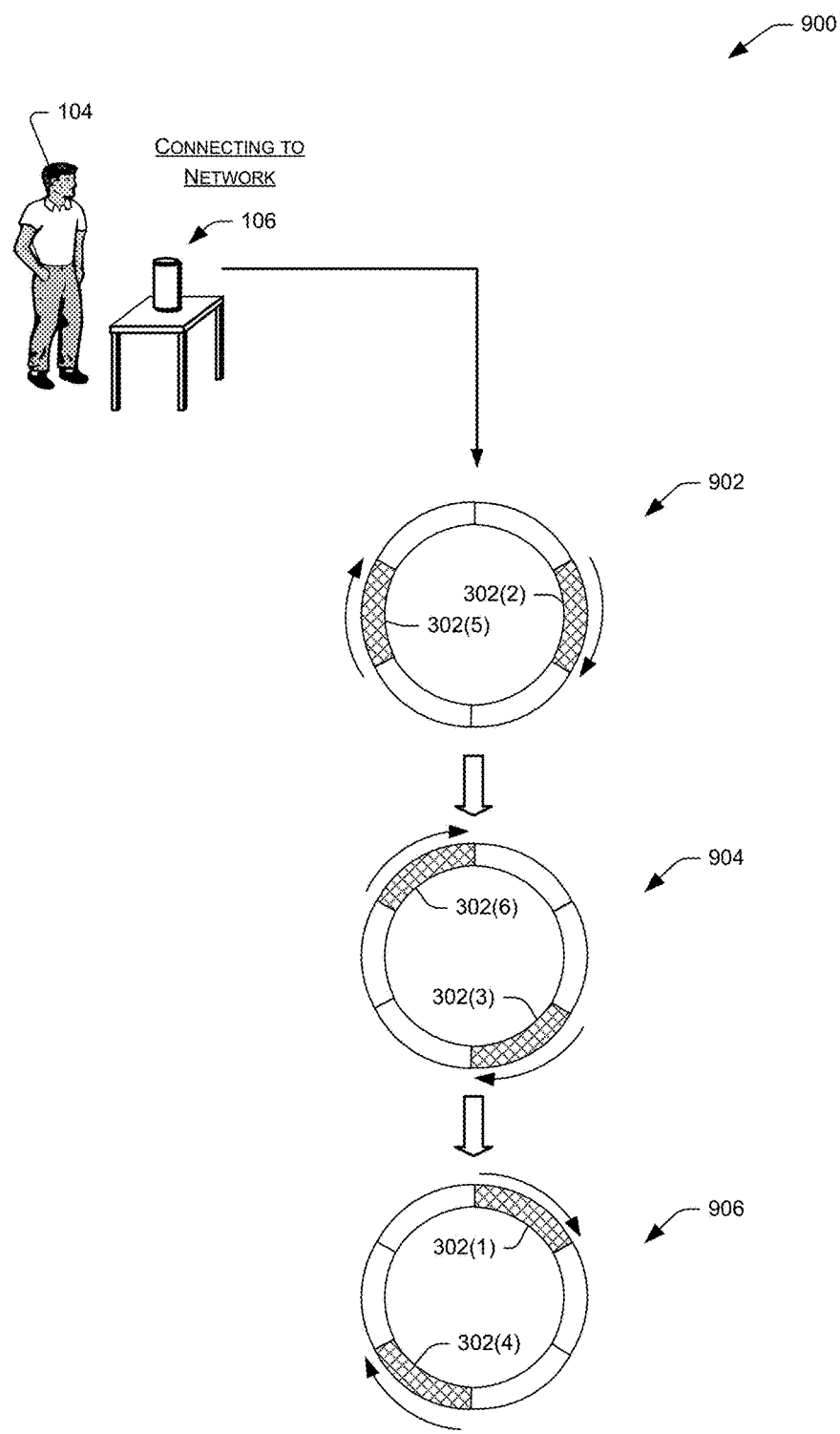
FIGS. 9A-9B illustrate example visual indications that a voice-controlled device may implement when connecting to a network.

FIG. 9A illustrates an example visual indication 900 that the voice-controlled device 106 may implement when connecting to a network, such as a wireless network of the user 104, or when authenticating the user 104. The device 106 may connect to the network upon initial power on as part of its configuration, in response to receiving a request from the user 104, or the like.

In this example, the device 106 indicates to the user 104 that it is attempting to connect to a network by having two light segments opposite one another "chase" each other around the perimeter of the device 106. At 902, for instance, the device 106 illuminates the segments 302(5) and 302(2) while refraining from illuminating the additional segments. At 904, the device 106 has ceased illuminating the previously illuminated segments and has now illuminated the segments 302(6) and 302(3) that are adjacent to the previously illuminated segments, respectively. In this example, the device 106 has illuminated the adjacent segments in the clockwise direction, although the device 106 may illuminate the adjacent segments in the counterclockwise direction in some instances. Finally, at 906, the device 106 has ceased illuminating the segments 302(6) and 302(3) and has illuminated the respectively adjacent segments 302(1) and 302(4). The device 106 may continue illuminating the segments in this manner until the device 106 establishes a connection, times out, or the like. In some instances, an illuminated segment may change colors each time the segment travels around the perimeter of the device 106.

Figure 9B:
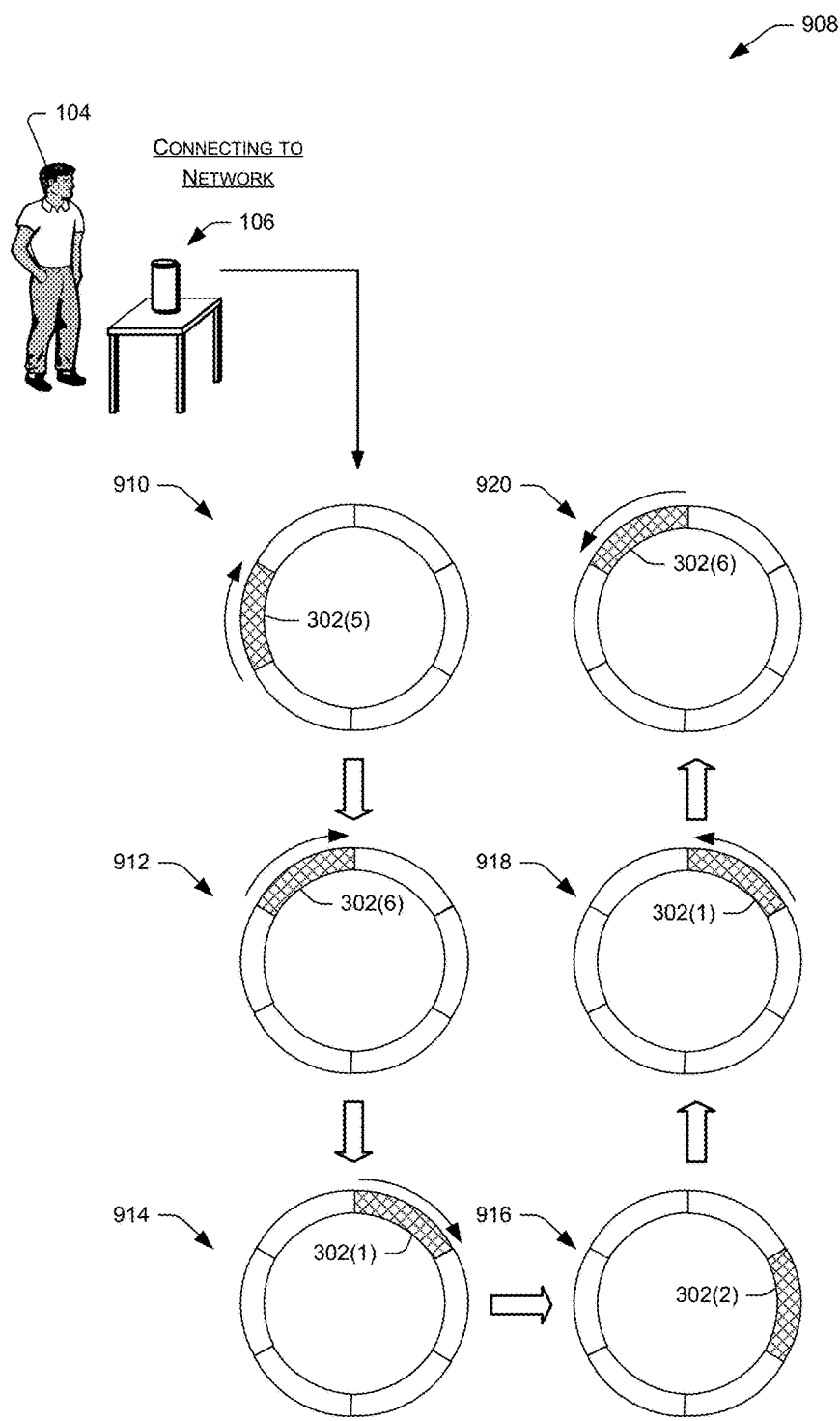

FIG. 9B illustrates an alternative visual indication 908 that the device 106 may implement when attempting to connect to a network or authenticating the user 104. Here, the device 106 may illuminate light segments in a back and forth manner around the perimeter of the voice-controlled device 106.

At 910, for instance, the device 106 first illuminates a light segment 302(5) at a first predetermined position. At 912, the device 106 ceases illumination of this segment 302(5) and illuminates a segment 302(6) that is adjacent in the clockwise direction. At 914, the device 106 illuminates the next adjacent segment 302(1) in the clockwise direction before illuminating, at 916, the next adjacent segment 302 (2).

Upon reaching this second predefined position, the device 106 may cause the illumination to return back towards the first predetermined position. At 918, for instance, the device 106 illuminates the segment 302(1) that is adjacent in the counterclockwise direction. Finally, at 920, the device 106 illuminates the segment 302(6) that is adjacent in the counterclockwise direction. The device 106 may continue illuminating the light segments in this back-and-forth manner until the device 106 connects to a network, times out, or the like.

Figure 10:
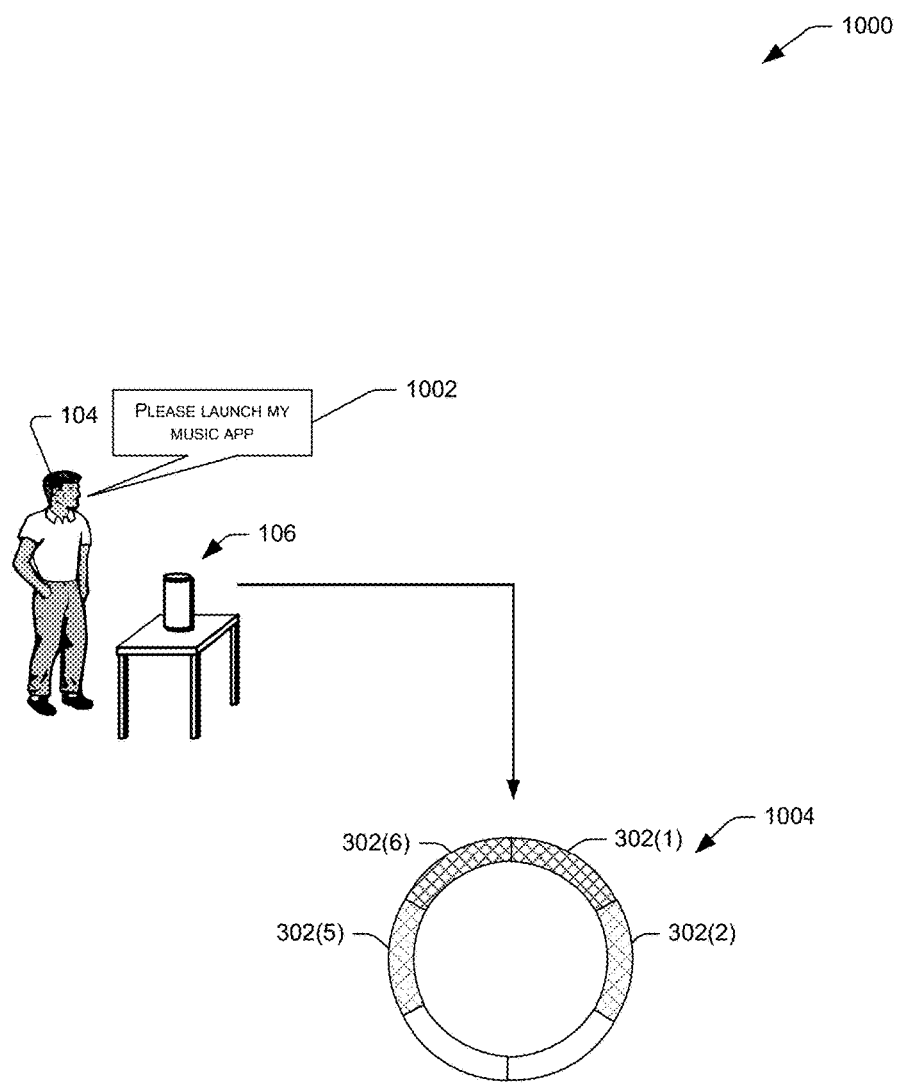
FIG. 10 illustrates an example visual indication that a voice-controlled device may implement when running an application accessible to the device.

FIG. 10 illustrates an example visual indication 1000 that the voice-controlled device 106 may implement when running an application accessible to the device 106 (e.g., an application provided by a third-party service). In the illustrated example, the user 104 provides an audible command 1002 requesting that the device 106 "please launch [his] music app". In response, the device 106 determines an illumination pattern 1004 that is associated with the application and then illuminates the light segments accordingly. In the illustrated example, the illumination pattern 1004 specifies that the light segments 302(1) and 302(6) are to be fully illuminated, while the light segments 302(2) and 302 (5) are to be partially illuminated. In some instances, the illumination pattern 1004 may be selected by the third-party service that offers the application, the user 104, or the like.

Furthermore, the illumination pattern 1004 may implement different colors of light in addition to or instead of different locations of illumination.

Although many of the example visual indications illustrated in FIGS. 3-10 include one or more non-illuminated segments, in some instances the device 106 may utilize color to indicate the one or more non-illuminated segments. For example, in returning to FIG. 5B, at 512 the segment 302(6) may be illuminated in a first color while the segments 302(1)-(5) are illuminated in second color.

Furthermore, although in many examples above the device 106 enters an operational state upon detecting sound from a user, it should be appreciated that an operational state may be entered upon the occurrence of any event, such as detecting sound from a device, selecting a button on the device 106, terminating an operation or process on the device 106, etc. Thereafter, any of the visual indications illustrated in FIGS. 3-10 may be presented. In one example, the device 106 obtains encoded information from sound output from another electronic device (e.g., cell phone, tablet device, etc.). The encoded information may include information for authenticating a user, such as a user's login and password, or information for connecting to a network, such as a network ID and password. The encoded information may be decoded and an operation may be performed based on the decoded information, such as authenticating the user or connecting to the network. As the encoded information is received, processed, or the operation is performed, the device 106 may illuminate one or more lights to indicate a state of the device 106.

Example Process

Figure 11:
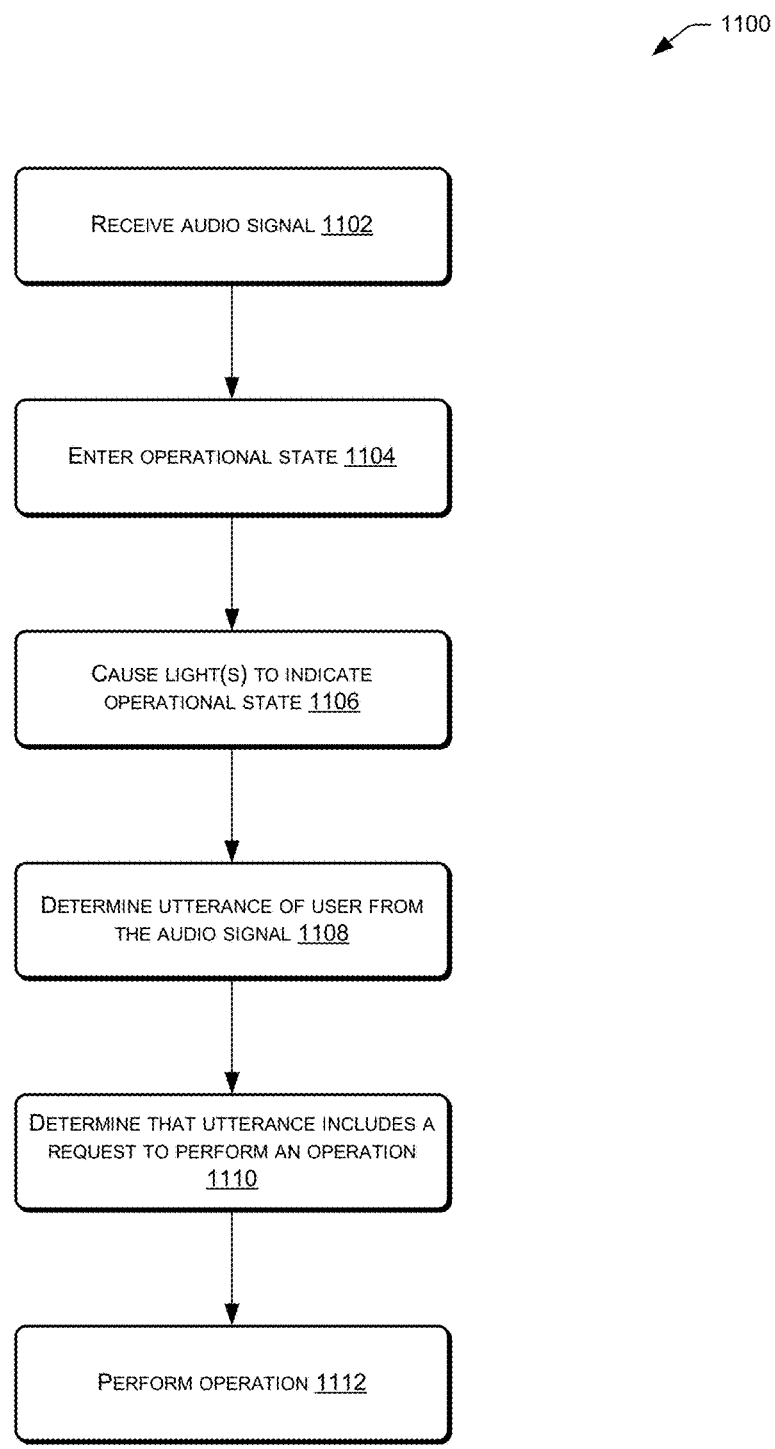
FIG. 11 depicts a flow diagram of an example process of the voice-controlled device causing lights of the device to indicate an operational state of the device.

FIG. 11 depicts a flow diagram of an example process 1100 of the voice-controlled device 106 illuminating the lights 108 to indicate an operational state of the voice-controlled device 106. While this process 1100 is illustrated as being performed by the voice-controlled device 106, it is to be appreciated that other computing devices may similarly implement this process and/or other processes described throughout.

Furthermore, the process 1100 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. Finally, the order in which the operations are described is not intended to be construed as a limitation, and any number of the described operations can be combined in any order and/or in parallel to implement the process.

At 1102, the voice-controlled device 106 may receive an audio signal from a microphone of the voice controlled device 106. In some instances, the audio signal may include an utterance from a user requesting that the device 106 perform a particular operation.

At 1104, the voice-controlled device 106 may enter an operational state. For example, the voice-controlled device 106 may enter an active state in which the voice-controlled device 106 is preparing to perform speech recognition, a state in which the voice-controlled device 106 is tracking a source of sound associated with the audio signal, a state in which the voice-controlled device 106 is processing the audio signal to determine a location of a source of sound associated with the audio signal, a state in which a microphone of the voice-controlled device 106 is turned off (e.g., muted), or the like.

At 1106, the voice-controlled device 106 may illuminate the lights 108 in a manner that indicates the operational state that the voice-controlled device 106 entered into at 1104. For example, the lights 108 may be illuminated in a particular sequence, pattern, color, and/or for a particular period of time. In some instances, the lights 108 are illuminated in a color that is specified by an application and/or user.

At 1108, the voice-controlled device 106 may determine the utterance of the user from the audio signal received at 1102. In some instances, the utterance may include a request or command that the voice-controlled device 106 perform a particular operation.

At 1110, the voice-controlled device 106 may determine that the utterance includes a request or command that the voice-controlled device 106 perform a particular operation. The request or command may, for example, request or command that the voice-controlled device 106 awake from an inactive state, adjust volume, power-on or power-off, search a database, output entertainment (e.g., games, music, movies or other content, etc.), perform personal management operations (e.g., calendaring, note taking, etc.), shop online, perform a financial transaction, and so forth.

At 1112, the voice-controlled device 106 may perform an operation requested in the utterance. For example, the voice-controlled device 106 may adjust volume, power-on or power-off, search a database, output entertainment (e.g., games, music, movies or other content, etc.), perform personal management operations (e.g., calendaring, note taking, etc.), shop online, perform a financial transaction, and so forth. When, at 112, the requested operation in the utterance begins to be performed, the device 106 may enter another operational state associated with the requested operation. Here, one or more lights of the device 106 may be illuminated in a different manner to indicate that the device 106 has entered this operational state.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. An apparatus comprising:
   a cylindrically shaped housing;
   a microphone residing at least partly within the housing;
   a plurality of lights arranged along a perimeter of a top portion of the housing;
   one or more processors; and
   one or more computer-readable media storing computer-executable instructions that, when executed on the one or more processors, cause the one or more processors to perform acts comprising:
   receiving an audio signal from the microphone;
   determining an utterance of a user from the audio signal, the utterance specifying an operation to be performed by the apparatus;
   determining a direction of the user relative to the apparatus;
   illuminating one or more of the plurality of lights in a particular pattern to indicate that the apparatus has determined the direction of the user, wherein the particular pattern is one of a plurality of patterns, wherein an individual pattern of the plurality of patterns corresponds to an individual operational state of a plurality of operational states of the apparatus, wherein the individual pattern provides a visual indication of the individual operational state of the apparatus, and wherein the individual operational state is based at least in part on the operation to be performed by the apparatus specified by the utterance; and
   performing the operation specified by the utterance.

2. The apparatus of claim 1, wherein the particular pattern comprises less than all of the plurality of lights along the perimeter of the top portion of the housing in the direction of the user determined by the apparatus.

3. The apparatus of claim 1, the acts further comprising:
   determining an amplitude of the utterance; and
   altering an intensity of the one or more of the plurality of lights in the particular pattern based at least in part on the amplitude of the utterance.

4. The apparatus of claim 3, wherein determining the amplitude of the utterance comprises determining a volume of the utterance or a frequency of the utterance.

5. The apparatus of claim 1, the acts further comprising:
   determining an additional sound from the audio signal;
   determining a direction of a source of the additional sound; and
   illuminating one or more additional lights of the plurality of lights that are in the direction of the source of the additional sound.

6. The apparatus of claim 5, wherein illuminating the one or more additional lights of the plurality of lights that are in the direction of the source of the additional sound comprises altering an intensity of the one or more additional lights based at least in part on changes in an amplitude of the additional sound.

7. An apparatus comprising:
   a microphone;
   a plurality of lights;
   one or more processors; and
   one or more computer-readable media storing computer-executable instructions that, when executed by the one or more processors, cause the one or more processors to perform acts comprising:
   receiving an audio signal from the microphone;
   determining, based at least in part on the audio signal, a direction of a source of sound;
   illuminating at least one of the plurality of lights in the direction of the source;
   determining an utterance from the audio signal, wherein the utterance corresponds to an operational state of the apparatus;
   illuminating the at least one of the plurality of lights in a particular pattern to indicate an operation associated with the operational state, wherein the particular pattern is one of a plurality of patterns, wherein the particular pattern of the plurality of patterns corresponds to the operational state of a plurality of operational states of the apparatus, wherein the particular pattern provides a visual indication of the operational state of the apparatus, and wherein the operational state is based at least in part on the operation to be performed by the apparatus associated with the utterance; and performing the operation specified by the utterance.

8. The apparatus of claim 7, wherein the plurality of lights comprise at least one of discrete segments of a single integrated light or multiple discrete lights and wherein a first one of the plurality of lights is adjacent to a second one of the plurality of lights.

9. The apparatus of claim 7, wherein the plurality of lights are arranged in a circle or ellipse near a top portion of the apparatus.

10. The apparatus of claim 7, wherein at least a portion of the audio signal represents the utterance spoken by a user, the utterance being associated with awaking the apparatus from an inactive state to the operational state of the plurality of operational states.

11. The apparatus of claim 7, wherein the illuminating the at least one of the plurality of lights in the particular pattern comprises illuminating each light of the plurality of lights in the particular pattern corresponding to the operational state of the plurality of operational states of the apparatus.

12. The apparatus of claim 11, further comprising:
based at least in part on the determining the direction of the source of the sound and after illuminating each light of the plurality of lights in the particular pattern corresponding to the operational state of the apparatus, illuminating a first subset of lights of the plurality of lights that are positioned in the direction of the source of the sound.

13. The apparatus of claim 12, further comprising:
determining that the source of the sound has changed to a changed direction relative to the apparatus; and
based at least in part on the determining that the source of the sound has changed to the changed direction, illuminating a second subset of lights of the plurality of lights that are closest to the one or more lights of the plurality of lights that are positioned in the changed direction of the source of the sound.

14. The apparatus of claim 7, wherein the audio signal includes a request to perform the operation associated with the apparatus.

15. The apparatus of claim 7, wherein the plurality of operational states comprises at least one of the apparatus:
powering on,
powering off,
preparing to perform speech recognition on the audio signal,
tracking the source of sound associated with the audio signal,
performing speech recognition on the audio signal,
identifying an error due to an inability of the apparatus to identify another utterance in the audio signal,
adjusting volume of the apparatus,
determining or authenticating an identity of a user,
connecting to a network,
updating software,
transferring data to or from the apparatus,
identifying an error on the apparatus or another apparatus associated with the apparatus,
running an application, or
turning off the microphone of the apparatus.

16. The apparatus of claim 7, wherein a light of the plurality of lights comprises at least one of a light-emitting diode, a fluorescent light, an incandescent light, a laser, or a portion of a flat panel display.

17. A method implemented at least in part by an electronic device that includes a microphone and one or more lights, the method comprising:
receiving an audio signal from the microphone;
determining an utterance of a user from the audio signal, the utterance comprising a request from the user;
determining a direction of the user relative to the electronic device;
causing the electronic device to enter an operational state based at least in part on the request;
causing at least one of the one or more lights to illuminate in the direction of the user relative to the electronic device;
causing the at least one of the one or more lights to illuminate in a particular pattern to indicate the operational state of the electronic device, wherein the particular pattern is one of a plurality of patterns, wherein the particular pattern of the plurality of patterns corresponds to the operational state of a plurality of operational states of the electronic device, wherein the particular pattern provides a visual indication of the operational state of the apparatus, and wherein the operational state is based at least in part on an operation to be performed by the electronic device associated with the utterance; and
causing the electronic device to perform an operation corresponding to the operational state.

18. The method of claim 17, wherein the one or more lights comprise a plurality of lights arranged in a circular or elliptical shape around a top portion of the electronic device.

19. The method of claim 17, wherein the one or more lights comprise a plurality of lights arranged in a polygonal shape near a top portion of the electronic device.

20. The method of claim 17, wherein the utterance comprises the user requesting that the electronic device transition from an inactive state to the operational state of the plurality of operational states.

21. The method of claim 20, wherein the request is a first request, and wherein:
the operational state comprises a state in which the electronic device is awaiting to receive a further audio signal comprising a second request to perform a particular operation associated with the electronic device, the method further comprising:
illuminating each of the one or more lights to indicate the operational state.

22. The method of claim 17, wherein:
the operational state of the plurality of operation states comprises a state in which the electronic device is determining a direction of the source of the sound associated with the audio signal; and
the causing the at least one of the one or more lights to illuminate in the direction of the user relative to the electronic device comprises illuminating a light of the one or more lights positioned in the direction of the source of the sound.

23. The method of claim 17, wherein:
the operational state of the plurality of operation states comprises a state in which the electronic device is determining a direction of the source of the sound associated with the audio signal; and
the causing the at least one of the one or more lights to illuminate in the direction of the user relative to the electronic device comprises illuminating each of the one or more lights other than a light of the one or more lights positioned in the direction of the source of the sound.

24. The method of claim 17, wherein the operational state is a first operational state, the utterance is a first utterance, and wherein:
a second operational state of the plurality of operation states comprises a state in which the electronic device is unable to determine a second utterance from the audio signal, the method further comprising:
causing the at least one of the one or more lights to illuminate in a predetermined pattern of the plurality of patterns indicating that the electronic device is unable to determine the second utterance.

25. The method of claim 17, wherein:
the operational state of the plurality of operation states comprises a state in which the electronic device has determined that the audio signal includes both the utterance from the user and an additional sound from an additional source, the method further comprising:
causing an illuminated or non-illuminated segment of the one or more lights to move to a location of the one or more lights that is in a direction of the additional source to indicate a direction of the additional source.

26. The method of claim 25, wherein the illuminated or non-illuminated segment of the one or more lights moves to the location of the one or more lights that is in a direction of the additional source to indicate a direction of the additional source, while another illuminated or non-illuminated segment of the one or more lights remains fixated in the direction of the user providing the utterance.

27. The method of claim 17, wherein the operational state is a first operational state, and wherein:
a second operational state of the plurality of operation states comprises a state in which the microphone is turned off, the method further comprising:
illuminating the at least one light in a predetermined color based at least in part on the second operational state of the electronic device.

28. The method of claim 17, wherein:
the operational state of the plurality of operation states comprises a state in which a volume of audio content to be output by the electronic device is being decreased, the method further comprising:
illuminating a segment of the one or more lights; and
thereafter reducing at least one of a length of the segment of the one or more lights that is illuminated or an intensity of at least a portion of the segment of the one or more lights that is illuminated, wherein the reducing is based at least in part on the operational state of the electronic device.

29. The method of claim 17, wherein:
the operational state of the plurality of operation states comprises a state in which a volume of audio content to be output by the electronic device is being increased, the method further comprising:
illuminating a segment of the one or more lights; and
thereafter increasing at least one of a length of the segment of the one or more lights that is illuminated or an intensity of at least a portion of the segment of the one or more lights that is illuminated, wherein the increasing is based at least in part on the operational state of the electronic device.

30. The method of claim 17, wherein:
the operational state of the plurality of operation states comprises a state in which the electronic device has determined an identity of the user, the method further comprising:
illuminating the one or more lights in a predetermined color that is associated with the identified user.

31. A method comprising:
determining an operational state of an electronic device that includes: (i) a microphone to generate an audio signal from received sound, (ii) a speaker to provide output based on the audio signal, and (iii) one or more lights arranged around a perimeter of the electronic device;
determining a direction of a source of the received sound;
illuminating at least one of the one or more lights of the electronic device to indicate the direction of the source of the received sound;
determining an utterance from the received sound, wherein the operational state is based at least in part on the utterance;
illuminating the at least one of the one or more lights of the electronic device in a particular pattern to indicate the operational state of the electronic device, wherein the particular pattern is one of a plurality of patterns, wherein the particular pattern of the plurality of patterns corresponds to the operational state of a plurality of operational states of the electronic device, wherein the particular pattern provides a visual indication of the operational state of the electronic device, and wherein the operational state is based at least in part on an operation to be performed by the electronic device associated with the audio signal; and
performing the operation specified by the utterance.

32. The method of claim 31, wherein:
the operational state comprises at least one of a state in which the electronic device is connecting to a network or a state in which a user is authenticating with the electronic device; and
the illuminating the at least one of the one or more lights of the electronic device in the particular pattern comprises: (i) illuminating a first one of the plurality of lights and sequentially illuminating adjacent lights in a direction around the perimeter, and (ii) illuminating a second one of the lights that is opposite the first light and sequentially illuminating adjacent lights in the same direction around the perimeter.

33. The method of claim 31, wherein:
the operational state comprises at least one of a state in which the electronic device is connecting to a network or a state in which a user is authenticating with the electronic device; and
the illuminating the at least one of the one or more lights of the electronic device in the particular pattern comprises:
beginning at a first location of the one or more lights, sequentially illuminating adjacent segments of the one or more lights in a first direction until reaching a second location of the one or more lights; and
upon reaching the second location and beginning at the second location, sequentially illuminating adjacent segments of the one or more lights in a second, opposite direction until reaching the first location of the one or more lights.

34. The method of claim 31, wherein:
the operational state comprises a state in which the electronic device is powering on or powering off; and the illuminating the at least one of the one or more lights of the electronic device in the particular pattern comprises sequentially illuminating adjacent segments of the one or more lights around the perimeter in a predetermined direction.

35. The method of claim 34, wherein the segments of the one or more lights are illuminated in a first color a first time around the perimeter and are illuminated in a second color a second time around the perimeter.

36. The method of claim 31, wherein:
the operational state comprises at least one of a state in which volume of the output of the electronic device is being changed, a state in which the electronic device is updating software on the electronic device, or a state in which data is being transferred to or from the electronic device; and
the illuminating the at least one of the one or more lights of the electronic device in the particular pattern comprises illuminating adjacent segments of the one or more lights to increase in length a portion of the one or more lights that are illuminated.

37. The method of claim 36, wherein the segments of the one or more lights are illuminated in a first color a first time around the perimeter and are illuminated in a second color a second time around the perimeter.

38. The method of claim 31, wherein:
the operational state comprises a state in which an error has occurred on at least one of the electronic device, a remote cloud computing device, or another electronic device in communication with the electronic device; and
the illuminating the at least one of the one or more lights of the electronic device in the particular pattern comprises illuminating the one or more lights in predetermined pattern that is associated with identifying the error.

39. The method of claim 31, wherein:
the operational state comprises a state in which an error has occurred on at least one of the electronic device, a remote cloud computing device, or another electronic device in communication with the electronic device; and
the illuminating the at least one of the one or more lights of the electronic device in the particular pattern comprises illuminating the one or more lights in predetermined color that is associated with identifying the error.

40. The method of claim 31, wherein:
the operational state comprises a state in which an application is running on the electronic device; and
the illuminating the at least one of the one or more lights of the electronic device in the particular pattern comprises illuminating the one or more lights in predetermined color or pattern that is associated with the application.

* * * * *

UNITED STATES PATENT AND TRADEMARK OFFICE
CERTIFICATE OF CORRECTION

PATENT NO. : 9,779,757 B1
APPLICATION NO. : 13/561840
DATED : October 3, 2017
INVENTOR(S) : Blanksteen et al.

It is certified that error appears in the above-identified patent and that said Letters Patent is hereby corrected as shown below:

In the Claims

Column 17, Line 58 – Column 24, Line 27, delete Claims 1-40 and insert the following Claims 1-40:

--1. An apparatus comprising:vb
    a cylindrically shaped housing;
    a microphone residing at least partly within the housing;
    a plurality of lights arranged along a perimeter of a top portion of the housing;
    one or more processors; and
    one or more computer-readable media storing computer-executable instructions that, when executed on the one or more processors, cause the one or more processors to perform acts comprising:
        receiving an audio signal from the microphone;
        determining an utterance of a user from the audio signal, the utterance specifying an operation to be performed by the apparatus;
        determining a direction of the user relative to the apparatus;
        illuminating one or more of the plurality of lights in a particular pattern to indicate that the apparatus has determined the direction of the user, wherein the particular pattern is one of a plurality of patterns,
        wherein an individual pattern of the plurality of patterns corresponds to an individual operational state of a plurality of operational states of the apparatus, wherein the individual pattern provides a visual indication of the individual operational state of the apparatus, and wherein the individual operational state is based at least in part on the operation to be performed by the apparatus specified by the utterance; and
        performing the operation specified by the utterance.

2. The apparatus of claim 1, wherein the particular pattern comprises less than all of the plurality of lights along the perimeter of the top portion of the housing in the direction of the user determined by the apparatus.

Signed and Sealed this
Twenty-first Day of November, 2017

Joseph Matal
*Performing the Functions and Duties of the
Under Secretary of Commerce for Intellectual Property and
Director of the United States Patent and Trademark Office*

3. The apparatus of claim 1, the acts further comprising:
   determining an amplitude of the utterance; and
   altering an intensity of the one or more of the plurality of lights in the particular pattern based at least in part on the amplitude of the utterance.

4. The apparatus of claim 3, wherein determining the amplitude of the utterance comprises determining a volume of the utterance or a frequency of the utterance.

5. The apparatus of claim 1, the acts further comprising:
   determining an additional sound from the audio signal;
   determining a direction of a source of the additional sound; and
   illuminating one or more additional lights of the plurality of lights that are in the direction of the source of the additional sound.

6. The apparatus of claim 5, wherein illuminating the one or more additional lights of the plurality of lights that are in the direction of the source of the additional sound comprises altering an intensity of the one or more additional lights based at least in part on changes in an amplitude of the additional sound.

7. An apparatus comprising:
   a microphone;
   a plurality of lights;
   one or more processors; and
   one or more computer-readable media storing computer-executable instructions that, when executed by the one or more processors, cause the one or more processors to perform acts comprising:
      receiving an audio signal from the microphone;
      determining, based at least in part on the audio signal, a direction of a source of sound;
      illuminating at least one of the plurality of lights in the direction of the source,
      determining an utterance from the audio signal, wherein the utterance corresponds to an operational state of the apparatus;
      illuminating the at least one of the plurality of lights in a particular pattern to indicate an operation associated with the operational state, wherein the particular pattern is one of a plurality of patterns, wherein the particular pattern of the plurality of patterns corresponds to the operational state of a plurality of operational states of the apparatus, wherein the particular pattern provides a visual indication of the operational state of the apparatus, and wherein the operational state is based at least in part on the operation to be performed by the apparatus associated with the utterance; and
      performing the operation specified by the utterance.

8. The apparatus of claim 7, wherein the plurality of lights comprise at least one of discrete segments of a single integrated light or multiple discrete lights and wherein a first one of the plurality of lights is adjacent to a second one of the plurality of lights.

9. The apparatus of claim 7, wherein the plurality of lights are arranged in a circle or ellipse near a top portion of the apparatus.

10. The apparatus of claim 7, wherein at least a portion of the audio signal represents the utterance spoken by a user, the utterance being associated with awaking the apparatus from an inactive state to the operational state of the plurality of operational states.

11. The apparatus of claim 7, wherein the illuminating the at least one of the plurality of lights in the particular pattern comprises illuminating each light of the plurality of lights in the particular pattern corresponding to the operational state of the plurality of operational states of the apparatus.

12. The apparatus of claim 11, further comprising:
   based at least in part on the determining the direction of the source of the sound and after illuminating each light of the plurality of lights in the particular pattern corresponding to the operational state of the apparatus, illuminating a first subset of lights of the plurality of lights that are positioned in the direction of the source of the sound.

13. The apparatus of claim 12, further comprising:
   determining that the source of the sound has changed to a changed direction relative to the apparatus; and
   based at least in part on the determining that the source of the sound has changed to the changed direction, illuminating a second subset of lights of the plurality of lights that are closest to the one or more lights of the plurality of lights that are positioned in the changed direction of the source of the sound.

14. The apparatus of claim 7, wherein the audio signal includes a request to perform the operation associated with the apparatus.

15. The apparatus of claim 7, wherein the plurality of operational states comprises at least one of the apparatus:
   powering on,
   powering off,
   preparing to perform speech recognition on the audio signal,
   tracking the source of sound associated with the audio signal,
   performing speech recognition on the audio signal,
   identifying an error due to an inability of the apparatus to identify another utterance in the audio signal,
   adjusting volume of the apparatus,
   determining or authenticating an identity of a user,
   connecting to a network,
   updating software,
   transferring data to or from the apparatus,
   identifying an error on the apparatus or another apparatus associated with the apparatus,
   running an application, or
   turning off the microphone of the apparatus.

16. The apparatus of claim 7, wherein a light of the plurality of lights comprises at least one of a light-emitting diode, a fluorescent light, an incandescent light, a laser, or a portion of a flat panel display.

17. A method implemented at least in part by an electronic device that includes a microphone and one or more lights, the method comprising:
   receiving an audio signal from the microphone;
   determining an utterance of a user from the audio signal, the utterance comprising a request from the user;
   determining a direction of the user relative to the electronic device;
   causing the electronic device to enter an operational state based at least in part on the request;
   causing at least one of the one or more lights to illuminate in the direction of the user relative to the electronic device;
   causing the at least one of the one or more lights to illuminate in a particular pattern to indicate the operational state of the electronic device, wherein the particular pattern is one of a plurality of patterns, wherein the particular pattern of the plurality of patterns corresponds to the operational state of a plurality of operational states of the electronic device, wherein the particular pattern provides a visual indication of the operational state of the apparatus, and wherein the operational state is based at least in part on an operation to be performed by the electronic device associated with the utterance; and
   causing the electronic device to perform an operation corresponding to the operational state.

18. The method of claim 17, wherein the one or more lights comprise a plurality of lights arranged in a circular or elliptical shape around a top portion of the electronic device.

19. The method of claim 17, wherein the one or more lights comprise a plurality of lights arranged in a polygonal shape near a top portion of the electronic device.

20. The method of claim 17, wherein the utterance comprises the user requesting that the electronic device transition from an inactive state to the operational state of the plurality of operational states.

21. The method of claim 20, wherein the request is a first request, and wherein:
   the operational state comprises a state in which the electronic device is awaiting to receive a further audio signal comprising a second request to perform a particular operation associated with the electronic device, the method further comprising:
   illuminating each of the one or more lights to indicate the operational state.

22. The method of claim 17, wherein:
   the operational state of the plurality of operation states comprises a state in which the electronic device is determining a direction of the source of the sound associated with the audio signal; and
   the causing the at least one of the one or more lights to illuminate in the direction of the user relative to the electronic device comprises illuminating a light of the one or more lights positioned in the direction of the source of the sound.

23. The method of claim 17, wherein:
   the operational state of the plurality of operation states comprises a state in which the electronic device is determining a direction of the source of the sound associated with the audio signal; and the causing the at least one of the one or more lights to illuminate in the direction of the user relative to the electronic device comprises illuminating each of the one or more lights other than a light of the one or more lights positioned in the direction of the source of the sound.

24. The method of claim 17, wherein the operational state is a first operational state, the utterance is a first utterance, and wherein:
   a second operational state of the plurality of operation states comprises a state in which the electronic device is unable to determine a second utterance from the audio signal, the method further comprising:
   causing the at least one of the one or more lights to illuminate in a predetermined pattern of the plurality of patterns indicating that the electronic device is unable to determine the second utterance.

25. The method of claim 17, wherein:
   the operational state of the plurality of operation states comprises a state in which the electronic device has determined that the audio signal includes both the utterance from the user and an additional sound from an additional source, the method further comprising:
   causing an illuminated or non-illuminated segment of the one or more lights to move to a location of the one or more lights that is in a direction of the additional source to indicate a direction of the additional source.

26. The method of claim 25, wherein the illuminated or non-illuminated segment of the one or more lights moves to the location of the one or more lights that is in a direction of the additional source to indicate a direction of the additional source, while another illuminated or non-illuminated segment of the one or more lights remains fixated in the direction of the user providing the utterance.

27. The method of claim 17, wherein the operational state is a first operational state, and wherein:
   a second operational state of the plurality of operation states comprises a state in which the microphone is turned off, the method further comprising:
   illuminating the at least one light in a predetermined color based at least in part on the second operational state of the electronic device.

28. The method of claim 17, wherein:
   the operational state of the plurality of operation states comprises a state in which a volume of audio content to be output by the electronic device is being decreased, the method further comprising:
       illuminating a segment of the one or more lights; and
       thereafter reducing at least one of a length of the segment of the one or more lights that is illuminated or an intensity of at least a portion of the segment of the one or more lights that is illuminated, wherein the reducing is based at least in part on the operational state of the electronic device.

29. The method of claim 17, wherein:
   the operational state of the plurality of operation states comprises a state in which a volume of audio content to be output by the electronic device is being increased, the method further comprising:
       illuminating a segment of the one or more lights; and thereafter increasing at least one of a length of the segment of the one or more lights that is illuminated or an intensity of at least a portion of the segment of the one or more lights that is illuminated, wherein the increasing is based at least in part on the operational state of the electronic device.

30. The method of claim 17, wherein:
the operational state of the plurality of operation states comprises a state in which the electronic device has determined an identity of the user, the method further comprising:
illuminating the one or more lights in a predetermined color that is associated with the identified user.

31. A method comprising:
determining an operational state of an electronic device that includes: (i) a microphone to generate an audio signal from received sound, (ii) a speaker to provide output based on the audio signal, and (iii) one or more lights arranged around a perimeter of the electronic device;
determining a direction of a source of the received sound;
illuminating at least one of the one or more lights of the electronic device to indicate the direction of the source of the received sound;
determining an utterance from the received sound, wherein the operational state is based at least in part on the utterance;
illuminating the at least one of the one or more lights of the electronic device in a particular pattern to indicate the operational state of the electronic device, wherein the particular pattern is one of a plurality of patterns, wherein the particular pattern of the plurality of patterns corresponds to the operational state of a plurality of operational states of the electronic device, wherein the particular pattern provides a visual indication of the operational state of the electronic device, and wherein the operational state is based at least in part on an operation to be performed by the electronic device associated with the audio signal; and
performing the operation specified by the utterance.

32. The method of claim 31, wherein:
the operational state comprises at least one of a state in which the electronic device is connecting to a network or a state in which a user is authenticating with the electronic device; and
the illuminating the at least one of the one or more lights of the electronic device in the particular pattern comprises: (i) illuminating a first one of the plurality of lights and sequentially illuminating adjacent lights in a direction around the perimeter, and (ii) illuminating a second one of the lights that is opposite the first light and sequentially illuminating adjacent lights in the same direction around the perimeter.

33. The method of claim 31, wherein:
the operational state comprises at least one of a state in which the electronic device is connecting to a network or a state in which a user is authenticating with the electronic device; and
the illuminating the at least one of the one or more lights of the electronic device in the particular pattern comprises:
beginning at a first location of the one or more lights, sequentially illuminating adjacent segments of the one or more lights in a first direction until reaching a second location of the one or more lights; and upon reaching the second location and beginning at the second location, sequentially illuminating adjacent segments of the one or more lights in a second, opposite direction until reaching the first location of the one or more lights.

34. The method of claim 31, wherein:
   the operational state comprises a state in which the electronic device is powering on or powering off; and
   the illuminating the at least one of the one or more lights of the electronic device in the particular pattern comprises sequentially illuminating adjacent segments of the one or more lights around the perimeter in a predetermined direction.

35. The method of claim 34, wherein the segments of the one or more lights are illuminated in a first color a first time around the perimeter and are illuminated in a second color a second time around the perimeter.

36. The method of claim 31, wherein:
   the operational state comprises at least one of a state in which volume of the output of the electronic device is being changed, a state in which the electronic device is updating software on the electronic device, or a state in which data is being transferred to or from the electronic device; and
   the illuminating the at least one of the one or more lights of the electronic device in the particular pattern comprises illuminating adjacent segments of the one or more lights to increase in length a portion of the one or more lights that are illuminated.

37. The method of claim 36, wherein the segments of the one or more lights are illuminated in a first color a first time around the perimeter and are illuminated in a second color a second time around the perimeter.

38. The method of claim 31, wherein:
   the operational state comprises a state in which an error has occurred on at least one of the electronic device, a remote cloud computing device, or another electronic device in communication with the electronic device; and
   the illuminating the at least one of the one or more lights of the electronic device in the particular pattern comprises illuminating the one or more lights in predetermined pattern that is associated with identifying the error.

39. The method of claim 31, wherein:
   the operational state comprises a state in which an error has occurred on at least one of the electronic device, a remote cloud computing device, or another electronic device in communication with the electronic device; and
   the illuminating the at least one of the one or more lights of the electronic device in the particular pattern comprises illuminating the one or more lights in predetermined color that is associated with identifying the error.

40. The method of claim 31, wherein:

the operational state comprises a state in which an application is running on the electronic device; and the illuminating the at least one of the one or more lights of the electronic device in the particular pattern comprises illuminating the one or more lights in predetermined color or pattern that is associated with the application.--